United States Patent [19]
Abe

[11] Patent Number: 5,497,246
[45] Date of Patent: Mar. 5, 1996

[54] IMAGE SIGNAL PROCESSING DEVICE

[75] Inventor: Nobuaki Abe, Sapporo, Japan

[73] Assignee: Asahi Kogaku Kogyo Kabushiki Kaisha, Tokyo, Japan

[21] Appl. No.: 275,357

[22] Filed: Jul. 15, 1994

[30]    Foreign Application Priority Data

Jul. 15, 1993 [JP] Japan .................... 5-197994
May 12, 1994 [JP] Japan .................... 6-123093

[51] Int. Cl.$^6$ ...................... H04N 1/41; H04N 11/02; G06T 9/00
[52] U.S. Cl. .................. 358/426; 358/430; 358/432; 348/403; 348/404; 348/405; 382/248; 382/250; 382/251; 382/252
[58] Field of Search ................ 358/426, 261.2, 358/430, 432; 348/403, 405, 404, 390, 384; 382/56, 252, 251, 250, 248

[56]          References Cited

U.S. PATENT DOCUMENTS 5,349,383  9/1994  Parke et al. ................ 348/405

FOREIGN PATENT DOCUMENTS 2855395  7/1979  Germany.

*Primary Examiner*—Scott A. Rogers
*Attorney, Agent, or Firm*—Sandler, Greenblum & Bernstein

[57]            ABSTRACT

A DCT processing circuit outputs DCT coefficients based on image data stored in an image memory. The DCT coefficients are quantized by a quantization processing circuit, then input to a Huffman encoding processing circuit and an inverse quantization processing circuit. In the inverse quantization processing circuit, the DCT coefficients are reproduced. The differences between the reproduced DCT coefficients and the DCT coefficients output from the DCT processing circuit are determined as the quantized error data by subtractors. An error data synthesizing unit stores the error data in a fourth component of a JPEG format and inputs the error data to the Huffman encoding processing circuit. The output signals of the quantization processing circuit and the output signals of the error data synthesizing unit are Huffman encoded and recorded to an IC memory card.

14 Claims, 28 Drawing Sheets

Fig. 3

8 × 8 PIXEL BLOCK $$P(Y)xy = \begin{Bmatrix} 159 & 153 & 158 & 152 & 140 & 138 & 132 & 132 \\ 164 & 162 & 162 & 157 & 151 & 142 & 134 & 132 \\ 167 & 168 & 161 & 160 & 158 & 145 & 139 & 134 \\ 164 & 168 & 161 & 166 & 162 & 152 & 149 & 141 \\ 171 & 166 & 168 & 167 & 163 & 162 & 157 & 151 \\ 173 & 164 & 169 & 170 & 166 & 166 & 162 & 161 \\ 175 & 169 & 172 & 176 & 174 & 172 & 174 & 166 \\ 173 & 172 & 175 & 173 & 180 & 181 & 177 & 172 \end{Bmatrix}$$

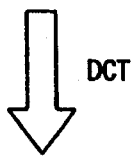 DCT

DCT COEFFICIENT $S_{00}$  $S_{10}$
$S_{01}$ $$S(Y)uv = \begin{Bmatrix} 260 & 49 & -16 & 5 & 2 & 4 & 0 & 1 \\ -79 & 36 & -2 & -7 & 1 & -3 & -1 & -2 \\ 0 & -8 & 3 & -2 & -2 & 1 & 5 & 1 \\ -8 & -4 & 5 & -4 & 1 & 7 & 6 & -2 \\ -2 & -6 & -1 & 0 & -4 & -1 & 0 & -1 \\ -3 & -2 & -1 & -1 & 1 & 2 & -5 & -1 \\ -4 & -1 & 1 & 0 & 0 & -2 & 2 & 0 \\ 1 & 1 & 1 & 1 & -1 & 1 & 0 & 0 \end{Bmatrix}$$

$S_{77}$

QUANTIZATION TABLE $$\begin{Bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{Bmatrix}$$

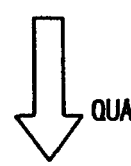 QUANTIZE ÷ Q(Y)uv =

$R_{00}$  QUANTIZED DCT COEFFICIENT $$R(Y)uv = \begin{Bmatrix} 16 & 4 & -2 & 0 & 0 & 0 & 0 & 0 \\ -7 & 3 & 0 & 0 & 0 & 0 & 0 & 0 \\ 0 & -1 & 0 & 0 & 0 & 0 & 0 & 0 \\ -1 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{Bmatrix}$$

Fig. 4

GROUPING OF DIFFERENTIAL VALUES OF DCT COEFFICIENTS

| SSSS GROUP NO. | DC DIFFERENTIAL VALUE | NO. OF ADDED BITS |
|---|---|---|
| 0  | 0 | 0 |
| 1  | -1, 1 | 1 |
| 2  | -3, -2, 2, 3 | 2 |
| 3  | -7.. -4, 4.. 7 | 3 |
| 4  | -15.. -8, 8.. 15 | 4 |
| 5  | -31.. -16, 16.. 31 | 5 |
| 6  | -63.. -32, 32.. 63 | 6 |
| 7  | -127.. -64, 64.. 127 | 7 |
| 8  | -255.. -128, 128.. 255 | 8 |
| 9  | -511.. -256, 256.. 511 | 9 |
| 10 | -1023.. -512, 512.. 1023 | 10 |
| 11 | -2047.. -1024, 1024.. 2047 | 11 |

Fig. 5

ENCODING TABLE FOR DIFFERENTIAL DC COEFFICIENTS

| SSSS | CODE LENGTH | CODE WORD |
|---|---|---|
| 0  | 2 | 00 |
| 1  | 3 | 010 |
| 2  | 3 | 011 |
| 3  | 3 | 100 |
| 4  | 3 | 101 |
| 5  | 3 | 110 |
| 6  | 4 | 1110 |
| 7  | 5 | 11110 |
| 8  | 6 | 111110 |
| 9  | 7 | 1111110 |
| 10 | 8 | 11111110 |
| 11 | 9 | 111111110 |

FOR LUMINANCE COMPONENT

Fig. 8

```
ZZ( )···0 LINE LENGTH:    -   0   0   1   0   2   0   54
EFFECTIVE COEFFICIENT:   16   4  -7   3  -2  -1  -1
         VALUE
DC VALUE(16)-PRIOR DC VALUE(25)=DIFFERENTIAL(-9) SSSS=4
                                       DC VALUE
                           CODE WORD FOR SSSS→101
                                 ADDED BITS→0110

ZZ01=( 4) SSSS=(3)RUN LENGTH=(0)
                           CODE WORD FOR SSSS→100
                                 ADDED BITS→100

ZZ02=(-7) SSSS=(3)RUN LENGTH=(0)
                           CODE WORD FOR SSSS→100
                                 ADDED BITS→000

ZZ04=( 3) SSSS=(2)RUN LENGTH=(1)
                           CODE WORD FOR SSSS→11011
                                 ADDED BITS→11

ZZ05=(-2) SSSS=(2)RUN LENGTH=(0)
                           CODE WORD FOR SSSS→01
                                 ADDED BITS→01

ZZ08=(-1) SSSS=(1)RUN LENGTH=(2)
                           CODE WORD FOR SSSS→11100
                                 ADDED BITS→0

ZZ09=(-1) SSSS=(1)RUN LENGTH=(0)
                           CODE WORD FOR SSSS→00
                                 ADDED BITS→0

EOB                        CODE WORD FOR EOB→1010

ENCODED DATA: 10101101001001000001101111010111110000001010
```
100

```
ZZ( )···0 RUN LENGTH :    -    0   0   1   0   2   0   54
EFFECTIVE COEFFICIENT:   16    4  -7   3  -2  -1  -1
         VALUE
```

Fig. 24A $$\begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix}$$

QUANTIZATION TABLE OF LUMINANCE SIGNALS Q(Y)uv

Fig. 24B $$\begin{bmatrix} 17 & 18 & 24 & 47 & 99 & 99 & 99 & 99 \\ 18 & 21 & 26 & 66 & 99 & 99 & 99 & 99 \\ 24 & 26 & 56 & 99 & 99 & 99 & 99 & 99 \\ 47 & 66 & 99 & 99 & 99 & 99 & 99 & 99 \\ 99 & 99 & 99 & 99 & 99 & 99 & 99 & 99 \\ 99 & 99 & 99 & 99 & 99 & 99 & 99 & 99 \\ 99 & 99 & 99 & 99 & 99 & 99 & 99 & 99 \\ 99 & 99 & 99 & 99 & 99 & 99 & 99 & 99 \end{bmatrix}$$

QUANTIZATION TABLE OF CHROMINANCE SIGNALS Q(Cb)uv, Q(Cr)uv

Fig. 27

SY, SCb, SCr [BITS]

|  | 7 | 6 | 5 | 4 | 3 | 2 | 1 | 0 |
|---|---|---|---|---|---|---|---|---|
| 8 | 3 | 5 | 9 | 17 | 37 | 85 | 255 | - |
| 7 |  | 3 | 5 | 9 | 19 | 43 | 127 | 129 |
| 6 |  |  | 3 | 5 | 9 | 21 | 63 | 65 |
| 5 |  |  |  | 3 | 5 | 11 | 31 | 33 |
| 4 |  | NOT NEEDED |  |  | 3 | 5 | 15 | 17 |
| 3 |  |  |  | F1 |  | 3 | 7 | 9 |
| 2 |  |  |  |  |  |  | 3 | 5 |
| 1 |  |  |  |  |  |  |  | 3 |

BY, BCd, BCr [BITS]

Fig. 28

| QY | QC | REQ. NO. BITS | | | IND. BIT DISTRIBUTION | | | OVERALL BIT DISTRIBUTION | | |
|---|---|---|---|---|---|---|---|---|---|---|
| | | BY | BCb | BCr | B'Y | B'Cb | B'Cr | B"Y | B"Cb | B"Cr |
| 16 | 17 | 4 | 5 | 5 | 4 | 3 | 3 | 4 | 4 | 4 |
| 24 | 99 | 5 | 7 | 7 | 5 | 3 | 3 | 5 | 3 | 3 |
| 7 | 65 | 3 | 7 | 7 | 3 | 3 | 3 | 3 | 4 | 4 |
| 129 | 3 | 8 | 2 | 2 | 5 | 2 | 2 | 7 | 2 | 2 |

4TH EMBODIMENT    5TH EMBODIMENT

IMAGE SIGNAL PROCESSING DEVICE

BACKGROUND OF THE INVENTION

1. Field of the Invention

The present invention relates to an image signal processing device for recording a color still image on a recording medium or reproducing the same in accordance with a JPEG algorithm.

2. Description of the Related Art

A standardized algorithm for the encoding of high resolution images and the transfer of that information through telecommunication transmission channels has been recommended by the JPEG (Joint Photographic Expert Group). A color still image handled in the algorithm recommended by the JPEG, that is, the JPEG algorithm, can be constituted by a plurality of components, but for example, three components are enough when using a color still image comprised of luminance signals Y and differential color signals Cr and Cb. The other components are not used.

On the other hand, in the baseline process of the JPEG algorithm, to enable large-scale data compression, first the original image data is broken down into components on the spatial frequency axis by two-dimensional DCT transformation, the data expressed on the spatial frequency axis is quantized, and the quantized data is encoded. Accordingly, part of the information of the original image is lost by the two-dimensional DCT transformation and data compression by the quantization, so complete restoration of the original data at the receiving side is not possible.

SUMMARY OF THE INVENTION

Accordingly, the present invention has as its object the provision of an image signal processing device which enables reproduction of an image as close as possible to the original image.

According to the present inventions the image signal processing device is provided with orthogonal transformation means, quantization means, inverse quantization means, first error data producing means, encoding means, and recording means.

The orthogonal transformation means applies an orthogonal transformation to original image data comprised of at least one image component to obtain orthogonal transformation coefficients corresponding to predetermined spatial frequencies for each component. The quantization means quantizes the orthogonal transformation coefficients by quantization tables to obtain quantized orthogonal transformation coefficients. The inverse quantization means inversely quantizes the quantized orthogonal transformation coefficients to obtain reproduced orthogonal transformation coefficients. The first error data producing means obtains the difference between the reproduced orthogonal transformation coefficients and the orthogonal transformation coefficients, that is, the quantized error data, for each component. The encoding means encodes the quantized error component and the quantized orthogonal transformation :coefficients to form compressed image data. The recording means records the compressed image data on a recording medium.

BRIEF DESCRIPTION OF THE DRAWINGS

FIG. 3 is a view of an example of image data P(Y)xy, a DCT transformation coefficient S(Y)uv, and a quantized DCT coefficient R(Y)uv in the first embodiment;

FIG. 4 is a view of the grouping of differential values of a DC component;

FIG. 5 is a view of an encoding table of the DC component;

FIG. 8 is a view of an example of data encoded by the Huffman encoding;

FIG. 24A is a view of an example of a quantization table of luminance signals;

FIG. 24B is a view of an example of a quantization table of differential color signals;

FIG. 27 is a view of a requantization coefficient;

FIG. 28 is a view of an example of a bit length and bit distribution required for storing quantized error data;

DESCRIPTION OF THE PREFERRED EMBODIMENTS

Figure 1:
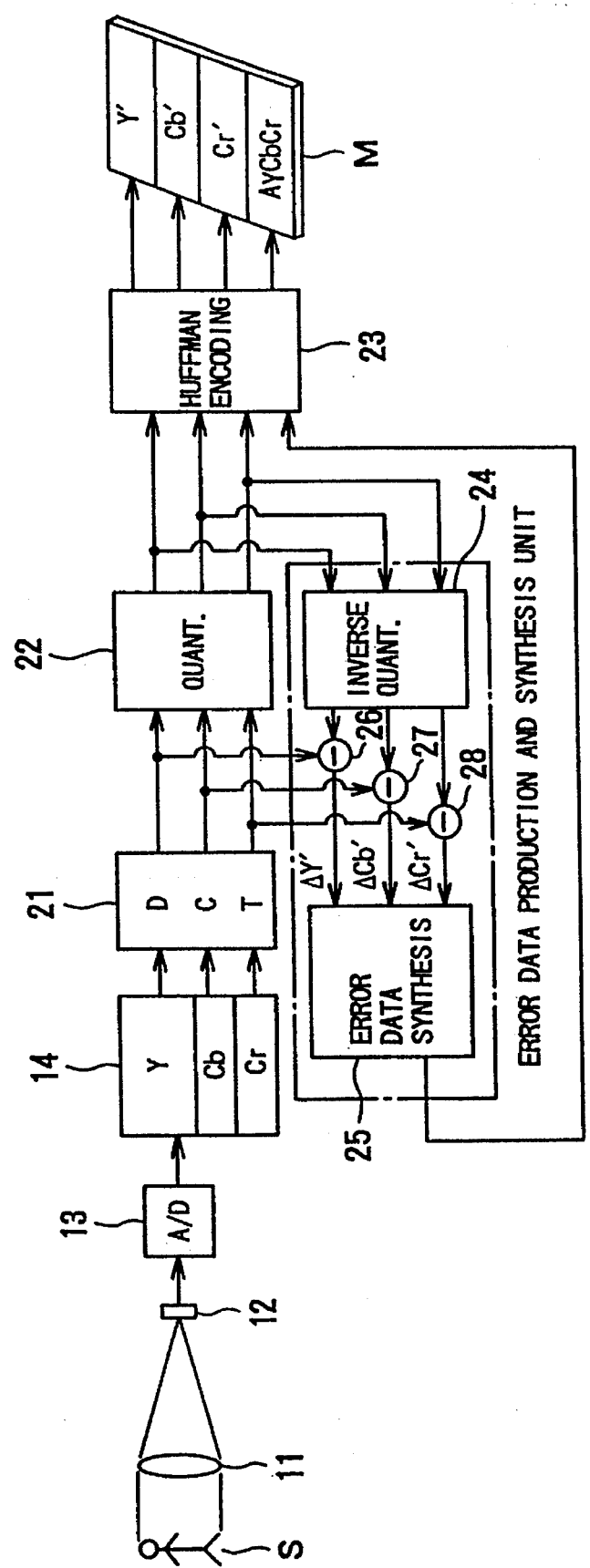
FIG. 1 is a block diagram of an image compression device constituting a part of the image signal processing device of a first embodiment of the present invention.

The present invention will be described below with reference to embodiments shown in the drawings.

FIG. 1 is a block diagram of an image compression device constituting a part of the image signal processing device of a first embodiment of the present invention.

Light coming from a subject S is condensed by a condenser lens 11 and an image of the subject is formed on a light receiving surface of a CCD (charge coupled device) 12. On the light receiving surface of the CCD 12 are disposed a large number of photoelectric conversion elements. Further, on the tops of the photoelectric conversion elements are provided, for example, color filters comprised of R, G, and B color filter elements. Each of these photoelectric conversion elements corresponds to a single pixel of data. The subject image is converted into electrical signals corresponding to predetermined colors by the photoelectrical conversion elements and these signals are then inputted to an A/D converter 13. Note that in the configuration of FIG. 1, only one CCD 12 is shown, but configurations with two or more CCDs provided are also possible.

The signals converted from an analog to digital format in the A/D converter 13 are converted into luminance signals Y and differential color signals Cb and Cr by a signal processing circuit, not shown, which are then inputted to an image memory 14. The image memory 14 is divided into mutually independent memory areas for separately storing the luminance signals Y and the differential color signals Cb and Cr. Each memory area has one image's worth of storage capacity.

The luminance signals Y and differential color signals Cb and Cr are read out from the image memory 14 and inputted to a DCT processing circuit 21 for data compression processing. In the DCT processing circuit 21, the differential color signals Y and the rest of the original image data are subjected to a discrete cosine transformation (hereinafter referred to as "DCT"). That is, in this embodiment a, DCT transformation is utilized as the orthogonal transformation of the original image data. Note that in FIG. 1, the DCT processing circuit 21 is shown as a single processing circuit, but in actuality, independent DCT processing circuits are provided for the luminance signals Y and differential color signals Cb and Cr.

An image compression device for the image memory signals employs a DCT processing circuit 21, quantization processing circuit 22, Huffman encoding processing circuit 23, inverse quantization processing circuit 24, and error data synthesizing unit 25. The luminance signals Y and the rest of the image data are divided into a plurality of blocks for one picture and are processed in units of blocks. Each block is comprised of 8×8 pixels of data.

The DCT coefficients of the luminance signals Y and the differential color signals Cb and Cr obtained in the DCT processing circuit 21 are inputted to the quantization processing circuit 22. A quantization processing circuit 22, like the DCT processing circuit 212 is provided for each signal. The DCT coefficients of the luminance signals Y and the differential color signals Cb and Cr inputted to the quantization processing circuit 22 are quantized by quantization tables comprised of 8×8 quantization coefficients. The quantization is a linear quantization, that is, the DCT coefficients are divided by the corresponding quantization coefficients.

Note that in the disclosed embodiment, the quantization table of the DCT coefficient of the luminance signals Y and the quantization table for the quantization of the DCT coefficients of the differential color signals Cb and Cr differ in accordance with the JPEG algorithm, but the same quantization table may also be used for each signals.

The quantized DCT coefficients of the luminance signals Y and the differential color signals Cb and Cr outputted from the quantization processing circuit 22 are inputted to the Huffman encoding processing circuit 23. The inputted signals are then Huffman encoded by a predetermined algorithm. The image signals (Y', Cb', and Cr') obtained by this Huffman encoding are recorded to an IC memory card M (recording medium) as the first to third component scan data.

While being inputted to the Huffman encoding processing circuit 23, the quantized DCT coefficients are also inputted to the inverse quantization processing circuit 24 where they are inversely quantized. Namely, the quantized DCT coefficients are multiplied by the inverse quantization coefficients of the inverse quantization tables in the inverse quantization processing circuit 24. Thus, restored DCT coefficients are obtained. The restored DCT coefficients and the DCT coefficients outputted from the DCT processing circuit 21 are inputted to the subtractors 26, 27, and 28 to compute the differences of the coefficients, that is, quantized error data (ΔY', ΔCb', and ΔCVr'). To limit the maximum number of bits of data, the quantized error data are quantized again in the error data synthesis unit 25 Huffman encoded in the Huffman encoding processing circuit 23, and recorded to the IC memory card M as scan data of the fourth component.

Note that when recording the image data to the IC memory card M, the quantization tables used in the quantization processing circuit 22 and the information of the Huffman encoding table of the Huffman encoding processing circuit 23 are incorporated into the image data and recorded to the IC memory card M.

Figure 2:
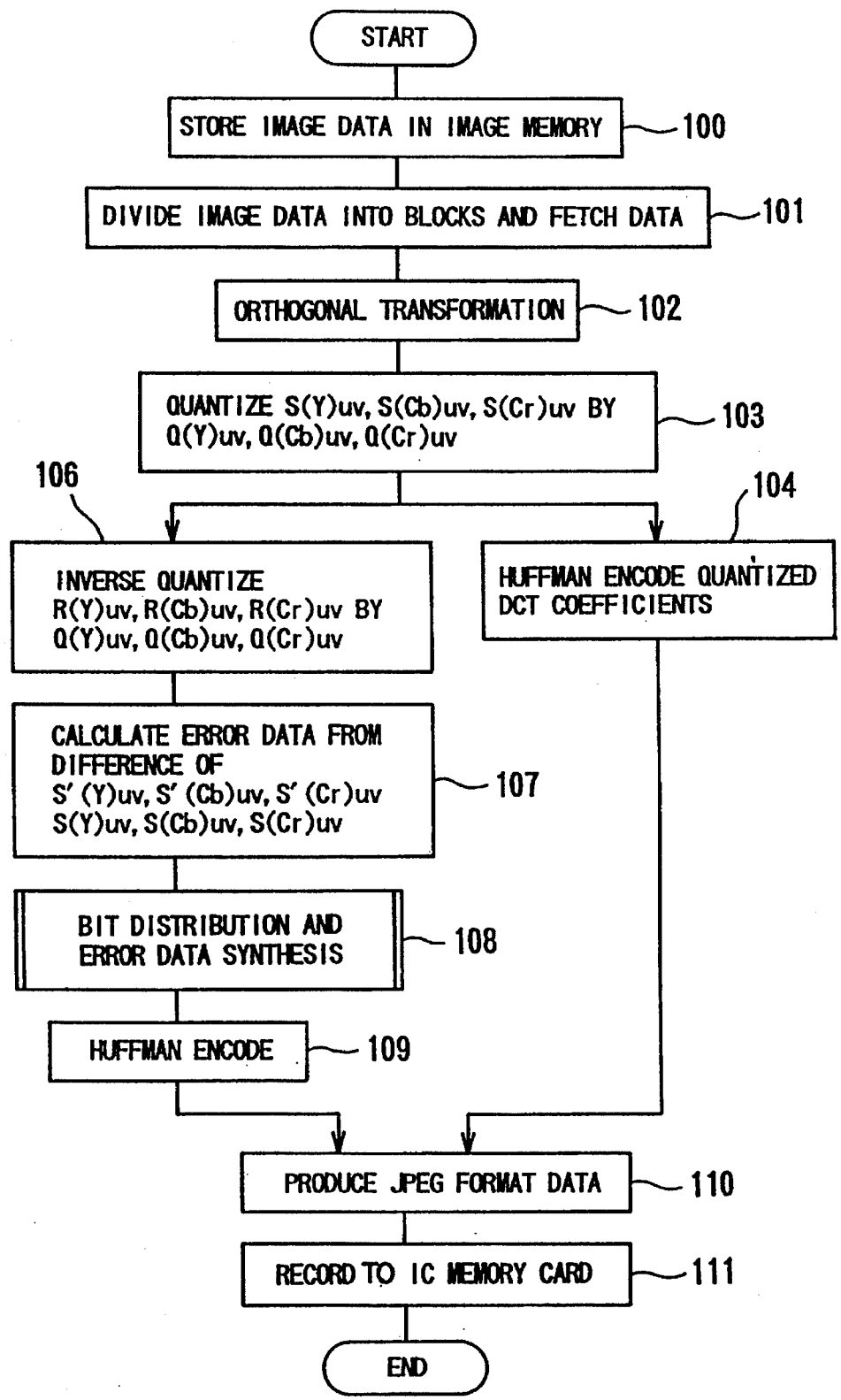
FIG. 2 is a flow chart of the image signal processing in the first embodiment.

FIG. 2 is a flow chart of a processing program for compressing the image data and recording the same to the IC memory card.

In step 100, analog chrominance signals R, G, and B read out from the CCD 12 are converted to digital data by the A/D converter 13, converted to the luminance signals Y and differential color signals Cb and Cr by the signal processing circuit, and inputted to the image memory 14. Thus, one image's worth of data is stored in the image memory 14. In step 101, the luminance signals Y and the differential color signals Cb and Cr are divided into 8×8 pixel blocks, read out from the image memory 14, and inputted to the DCT processing circuit 21 as block image data P(Y)xy, P(Cb)xy, and P(Cr)xy. In step 102, the image data P(Y)xy, P(Cb)xy, and P(Cr)xy are subjected to a two-dimensional DCT transformation in the DCT processing circuit 21 in accordance with equation (1) for each block:

$$S(Y)uv = \frac{1}{4} CuCv \sum_{x=0}^{7} \sum_{y=0}^{7} (P(Y)xy - Ls)\cos\frac{(2x+1)u\pi}{16} \cos\frac{(2y+1)v\pi}{16} \quad (1)$$

where, x,y=position of pixel in block u,v=position of DCT coefficient $C_u, C_v = 1/\sqrt{2}$; $u,v = 0$ $= 1$; otherwise $Ls = 128$; bit precision of $P_{xy} = 8$ bits Note that the P(Y)xy of equation (1) corresponds to the pixels of the original image data and, for example, 256 tones (8 bit precision) luminance signals Y and differential color signals Cb and Cr. Further, in equation (1), Ls is subtracted from the pixel values P(Y)xy to make the expected values of the DCT coefficients closer to 0. As a result of this subtraction, it is possible to encode the DCT coefficients by a shorter encoding length at the later mentioned Huffman encoding and a higher data compression rate can be expected.

In step 103, the 8×8 DCT coefficients S(Y)uv, S(Cb)uv, and S(Cr)uv found in the DCT processing circuit 21 are inputted to the quantization processing circuit 22 and are quantized by the quantization tables Q(Y)uv, Q(Cb)uv, and Q(Cr)uv.

FIG. 3 shows as an example image data P(Y)xy of a block of 8×8 pixels, a DCT coefficient S(Y)uv, a quantized DCT coefficient R(Y) uv, and a quantization table Q(Y)uv.

The image data P(Y)xy is converted to 8×8=64. DCT coefficients S(Y)uv by the two-dimensional DCT transformation of equation (1). Among these DCT coefficients, the DCT coefficient $S(Y)_{00}$ at position (0,0) is a DC (Direct Current) component, while the remaining 63 DCT coefficients S(Y)uv are an AC (Alternating Current) component. The AC component shows about how many higher spatial frequency components there are in the 8×8 pixel block image data from the coefficient $S(Y)_{01}$, or the coefficient $S(Y)_{10}$ to the coefficient $S(Y)_{77}$. The DC component shows the average value of the spatial frequency component of the 8×8 pixel block as a whole. Each DCT coefficient S(Y)uv corresponds to a predetermined spatial frequency.

The quantization table Q(Y)uv is used in the quantization processing circuit 22. However, separate tables may be used for quantizing each of the luminance signals Y and the differential color signals Cb and Cr. In this case, when recording the JPEG format image data to the IC memory card M, before the scan data storing each component, the content of the quantization table Q(Y)uv used for the quantization of the component data is recorded.

An equation for quantization of the DCT coefficient S(Y)uv using the quantization table Q(Y)uv is defined as follows:

$R(Y)uv = round(S(Y)uv/Q(Y)uv)$ $(0 \leq u,v \leq 7)$

The "round" in this equation means approximation to the nearest integer. Namely, the quantized DCT coefficient R(Y)uv as shown in FIG. 3 is obtained by division between elements of the DCT coefficient S(Y)uv and the quantization table Q(Y)uv and rounding off.

The quantized DCT coefficients R(Y)uv, R(Cb)uv, and R(Cr)uv obtained in the quantization processing circuit 22 are inputted to the Huffman encoding processing circuit 23 in the step 104 and to the inverse quantization processing circuit 24 in step 106.

An explanation will be made of the processing of step 104, that is, the Huffman encoding in the Huffman encoding processing circuit 23, using FIG. 4 through FIG. 7.

The encoding methods differ between the quantized DC component $R(Y)_{00}$ and the quantized AC component (quantized DCT coefficients R(Y)uv) other than quantized DC component $R(Y)_{00}$). The Huffman encoding of the quantized DC component $R(Y)_{00}$ is performed as follows:

First, the difference between the quantized DC component $R(Y)_{00}$ of the block currently to be encoded and the quantized DC component $R(Y)_{00}$ of the block previously encoded is obtained. If this difference falls under any of the groups shown in FIG. 4, the code word showing the number of the group is obtained from the encoding table (DC component encoding table) shown in FIG. 5. For example, if the quantized DC component $R(Y)_{00}$ of the block currently to be encoded is 16 and the quantized DC component $R(Y)_{00}$ of the block previously encoded is 25, the difference is −9. The −9 value is located under the "DC Differential Value" heading of the table of FIG. 4 and the (SSSS) group number in which the difference −9 falls is located in the lefthand column "SSSS Group No." as "4." Further, it is determined from the righthand column "code word" of the encoding table of FIG. 5 that the code word of the group number (SSSS) is "101."

To determine the number and value of add bits, reference is made to both the center column and the righthand column of FIG. 4. From the example, the righthand column that corresponds to the difference of −9 is "4" added bits. The value of the added bits corresponds to −9 being the seventh smallest value in SSSS Group "4". (The entire set of DC Differential Values for SSSS Group "4" being: −15, −14, −13, −12, −11, −10, −9, −8, 8, 9, 10, . . . 15.) However, when counting in this manner, the smallest number or first smallest number of the set (i.e., −15) is given the value "0" (−14 would then have a value of 1, −13 a value of 2, etc. Thus, the value of the four added bits is "0110" or binary 6 (seventh smallest minus 1=6). Namely, the Huffman code word of the quantized DC component $R(Y)_{00}$ of the block currently being encoded is "1010110."

Figure 6:
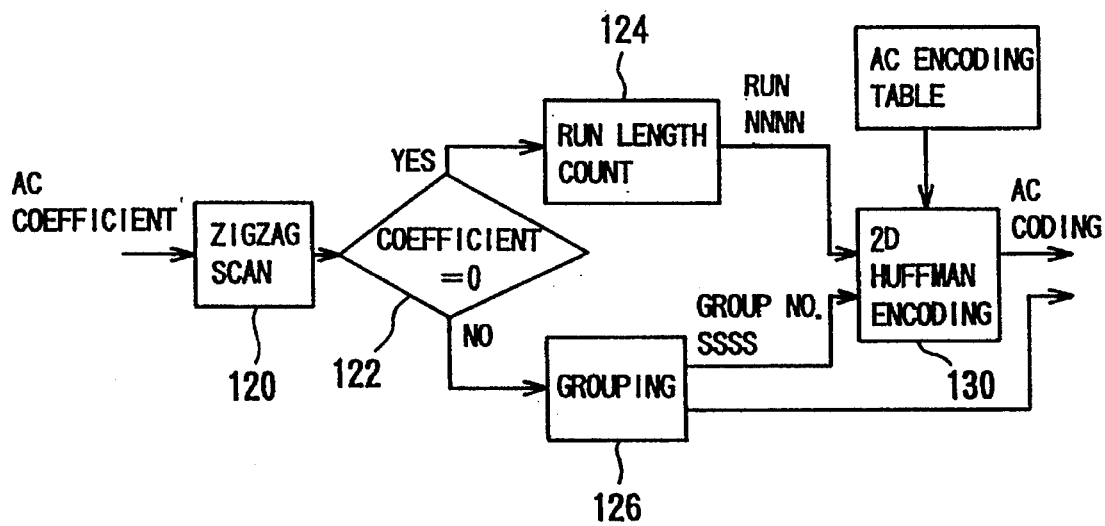
FIG. 6 is a flow chart of the processing routine for encoding a quantized AC component.

On the other hand, the Huffman encoding of the quantized AC component is performed by the processing routine shown in FIG. 6. First, in step 120, 63 quantized AC components are zigzag scanned in the order shown in FIG. 7 and are rearranged into a one-dimensional data array. Then, in step 122, a comparison is made to determine whether each of the quantized AC components arranged in the one dimensional array are "0." When a quantized AC component of "0" (meaning an invalid coefficient) is found, step 124 counts the number of the consecutive quantized AC components of "0" along the zigzag scan line. The number of consecutive "0"'s become the run length (NNNN).

When step 122 determines that the quantized AC component is not "0" (meaning a valid coefficient), step 126 determines the grouping (the same SSSS Group No. as the quantized DC component) and the number and value of added bits. This grouping of the quantized AC component differs from the grouping of the quantized DC component and is performed on the quantized AC component itself. Namely, when the quantized AC component is for example "4", a table similar to that of FIG. 4 is referred to in order to obtain the group number (SSSS) "3". Further, the quantized AC component "4" is the fifth from the smallest in the group of the group number (SSSS) =3, so the added bits become "100".

In step 130, the AC encoding table (not shown) is referred to. When the run length of the data just before the quantized AC component "4" is "0" the code word "100" is obtained from the run length and the group number (SSSS)=3. Further, the two-dimensional Huffman code word "100100" is obtained by combining this code word "100" and the added bits "100" obtained in step 126.

The result of the Huffman encoding of the quantized DCT coefficient of FIG. 3 is shown as the encoded data 100 of FIG. 8.

Referring again to FIG. 2, in step 110, predetermined data is added to the encoded data obtained in step 104, and thus, JPEG format data is generated. In step 111, this data and the scan data of the fourth component comprised of the later mentioned quantized error data are successively recorded in to the IC memory card M in accordance with the JPEG format.

Here, the JPEG format will be explained.

Figure 9:
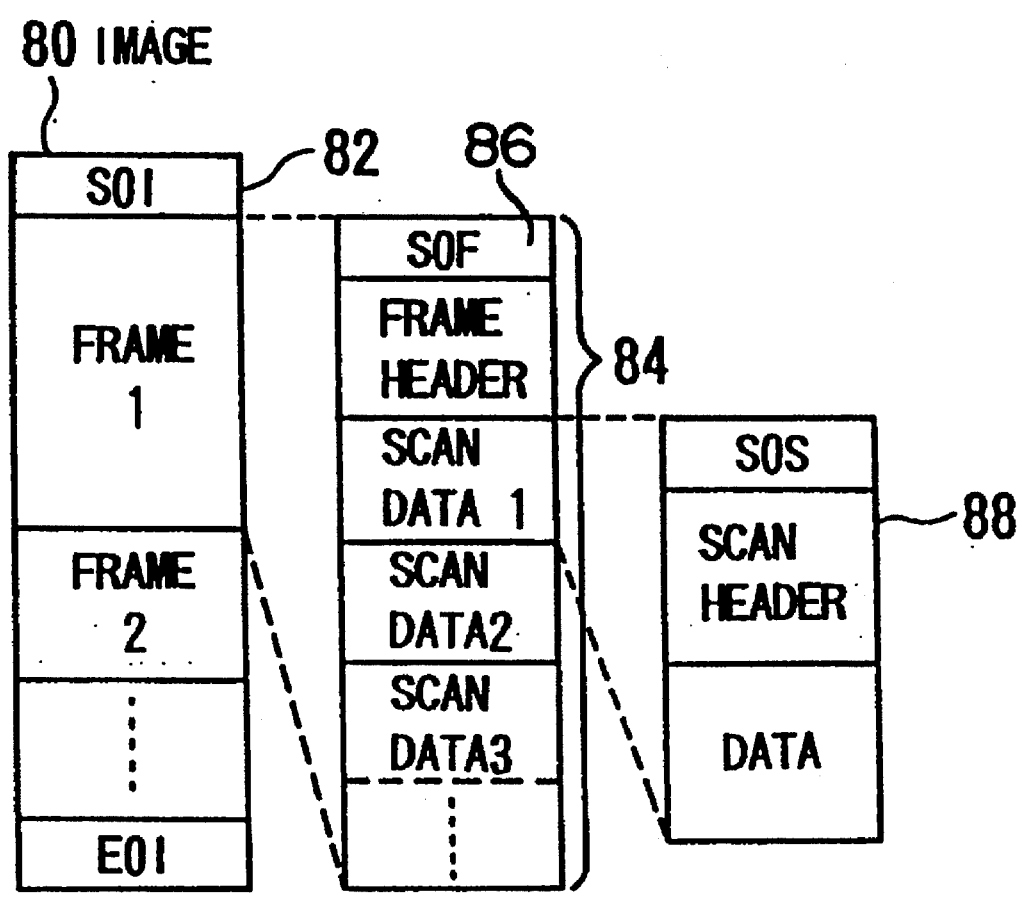
FIG. 9 is a view of the configuration of image data of the JPEG format.
Figure 10:
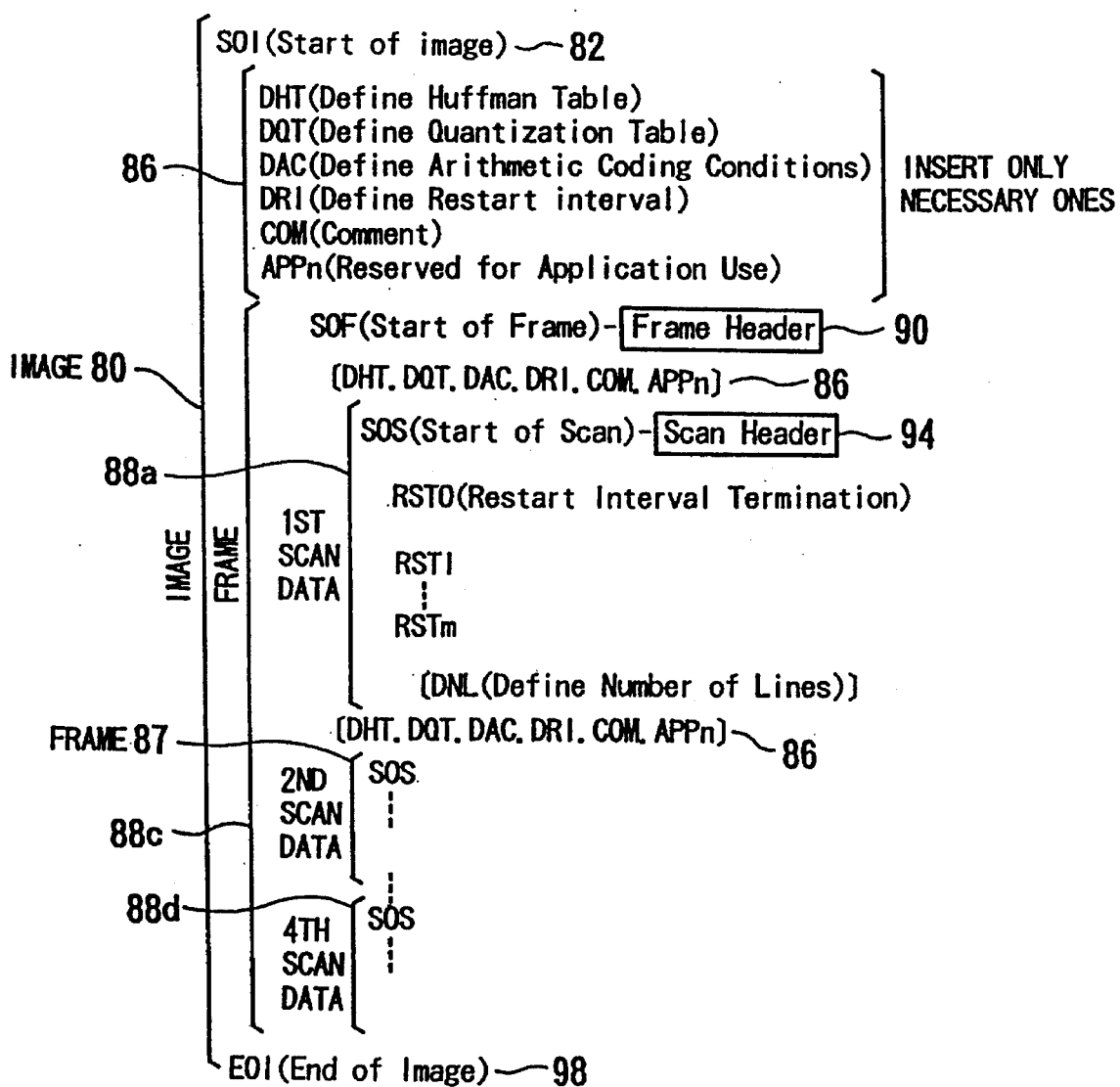
FIG. 10 is a view of the configuration of image data of the JPEG format.

FIG. 9 and FIG. 10 show the configurations of image data 80 comprised by the JPEG format. As shown in these figures, in image data 80 comprised by the JPEG format, the encoded data of one color still image is stored in at least one frame 84. The frames 84 are sandwiched between the SOI (Start of Image) marker 82 showing the start of the encoded data and the EOI (End of Image) marker showing the end of the encoded data.

After SOI marker 82 a frame header 86 is inserted. Frame header 86 includes various parameters relating to the frame information. The Define Huffman Table or "DHT" included in the frame header 86 shows the content of the Huffman encoding table, while Define Quantization Table or "DQT" shows the content of the quantization matrix. After frame header 86, is provided scan header 94 showing the start of the scan and the scan 88. Inside scan 88 encoded data is recorded.

Note that a "scan" means a rearrangement of the order of the transformation coefficients performed when Huffman encoding the transformation coefficients of the DCT transformation of the image data. There are various methods to this scan, including the non-interleave scan and the interleave scan. For example, at the time of the transformation coefficients $An=A1, A2 \ldots, Bn=B1, B2 \ldots, Cn=C1, C2 \ldots$ of the blocks of the component A are obtained. The non-interleave scan continuously rearranges the transformation coefficients independently for each component to give $A1, A2 \ldots, B1, B2 \ldots, C1, C2 \ldots$ This non-interleave scan requires three scans. The interleave scan is obtained by rearranges in a continuous fashion, the transformation coefficients of the pixel positions corresponding to the components to give $A1, B1, C1, A2, B2, C2 \ldots$ This interleave scan requires one scan.

The first through third scan data of the JPEG format (first through third components) comprise the encoded data of the luminance signals Y and differential color signals Cb and Cr to which the scan header 94 (FIG. 10) have been added. The fourth component stores in it the quantized error data which has been Huffman encoded. This processing is performed in steps 106 through 111 in FIG. 2 as explained below.

Figure 11:
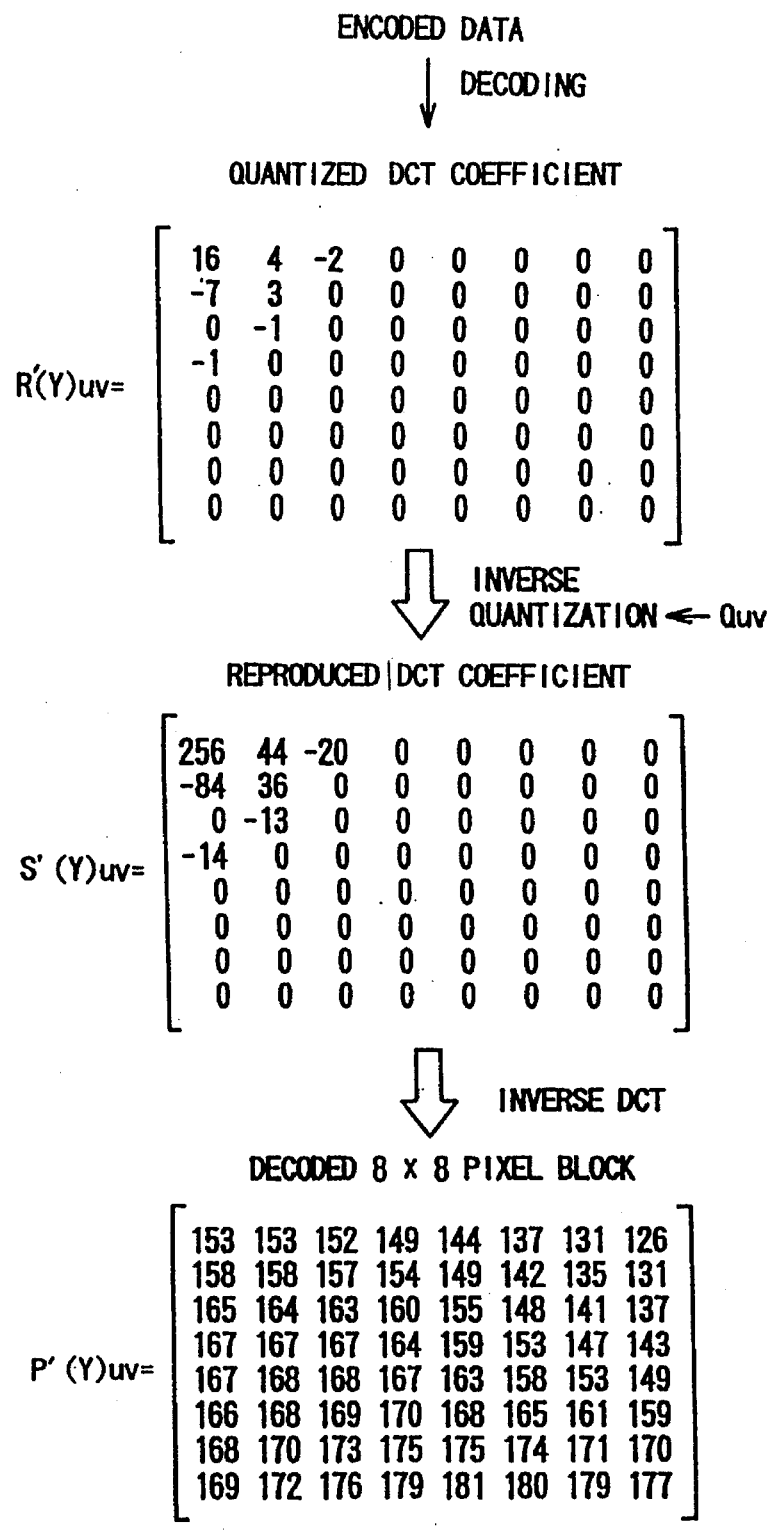
FIG. 11 is a view of an example of a quantized DCT coefficient, reproduced DCT coefficients and encoded image data.

In step 106, the inverse quantization processing circuit 24 performs an inverse quantization on the quantized DCT coefficients R(Y)uv, R(Cb)uv, and R(Cr)uv by the quantization tables Q(Y)uv, Q(Cb)uv, and Q(Cr)uv to obtain the restored DCT coefficients S'(Y)uv, S'(Cb)uv, and S'(Cr)uv. FIG. 11 shows examples of the restored DCT coefficient S'(Y)uv obtained by inverse quantization of the quantized DCT coefficient R(Y)uv shown in FIG. 3 by the quantization table Q(Y)uv.

In step 107, the restored DCT coefficients S'(Y)uv, S'(Cb)uv, and S'(Cr)uv are inputted to the subtractors 26, 27, and 28 so that the difference with the DCT coefficients S(Y)uv, S(Cb)uv, and S(Cr)uv before quantization (see FIG. 3), that is, the quantized error data ΔYuv, ΔCbuv, and ΔCruv, are calculated by the following equations (2), (3), and (4):

$$\Delta Yuv = S(Y)uv - S'(Y)uv \quad (2)$$
$$= S(Y)uv - R(Y)uv \cdot Q(Y)uv$$

-continued $$\Delta Cbuv = S(Cb)uv - S'(Cb)uv \quad (3)$$
$$= S(Cb)uv - R(Cb)uv \cdot Q(Cb)uv$$

$$\Delta Cruv = S(Cr)uv - S'(Cr)uv \quad (4)$$
$$= S(Cr)uv - R(Cr)uv \cdot Q(Cr)uv$$

Figure 7:
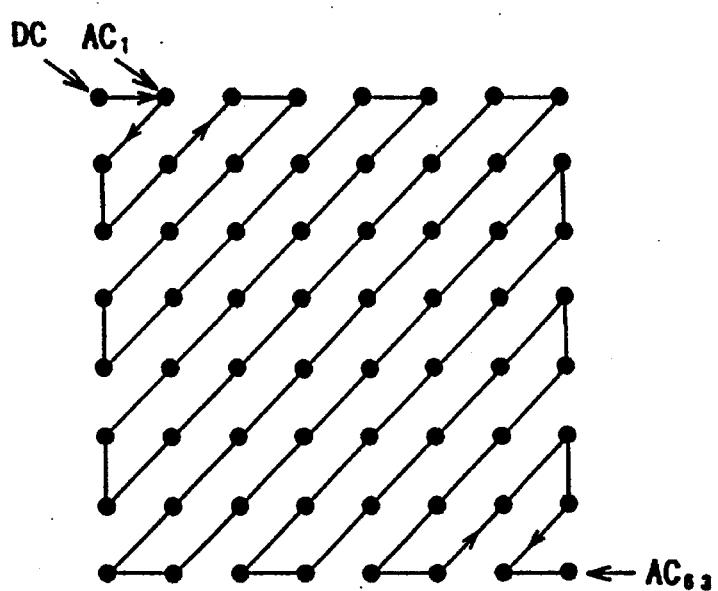
FIG. 7 is a view of the zigzag scan in a Huffman encoding of the AC component.

In step 108, the quantized error data ΔYuv, ΔCbuv, and ΔCruv are inputted to the error data synthesizing unit 25 where they are subjected to zigzag scanning (see FIG. 7). Then, as mentioned later, bit distribution is performed for each of the luminance signals Y and differential color signals Cr and Cb to obtain the error data.

There are a maximum of 12 bits in one unit of data before Huffman encoding in the baseline process of the JPEG algorithm. That is, the values of the quantized DCT coefficients inputted to the Huffman encoding processing circuit 23 may be a maximum of 12 bit values. However, the maximum for the DC component alone is 12 bits and the maximum for the AC component is 11 bits.

On the other hand, the values able to be taken by the quantized error data ΔYuv, ΔCbuv, and ΔCruv are integers satisfying the following equations (5) through (10):

$$Q(Y)uv/2 \leq \Delta Yuv < Q(Y)uv/2 \quad (S(Y)uv \geq 0) \quad (5)$$

$$Q(Y)uv/2 < \Delta Yuv \leq Q(Y)uv/2 \quad (S(Y)uv < 0) \quad (6)$$

$$Q(Cb)uv/2 \leq \Delta Cbuv < Q(Cb)uv/2 \quad (S(Cb)uv \geq 0) \quad (7)$$

$$Q(Cb)uv/2 < \Delta Cbuv \leq Q(Cb)uv/2 \quad (S(Cb)uv < 0) \quad (8)$$

$$Q(Cr)uv/2 \leq \Delta Cruv < Q(Cr)uv/2 \quad (S(Cr)uv \geq 0) \quad (9)$$

$$Q(Cr)uv/2 < \Delta Cruv \leq Q(Cr)uv/2 \quad (S(Cr)uv < 0) \quad (10)$$

As will be understood from these equations (5) through (10), the numerical range of the quantized error data ΔYuv, ΔCbuv, and ΔCruv changes depending on the quantization tables Q(Y)uv, Q(Cb)uv, and Q(Cr)uv. Further, the maximum number of bits $B_y$, $B_{cb}$, and $B_{cr}$ able to be taken by the quantized error data ΔYuv, ΔCbuv, and ΔCruv are determined by the following equations (11) through (13):

$$B_y = round\ (log_2(Q_y-1)+0.5) \quad (11)$$

$$B_{cb} = round\ (log_2(Q_{cb}-1)+0.5) \quad (12)$$

$$B_{cr} = round\ (log_2(Q_{cr}-1)+0.5) \quad (13)$$

The $Q_y$, and $Q_{cb}$, in these equations are the maximum values in the quantization tables Q(Y)uv, Q(Cb)uv, and Q(Cr)uv. For example, in the case of the quantization table Q(Y)uv of FIG. 3, $Q_y=121$. Accordingly, $B_y=$round $(6.90689+0.5)=7$. When the quantized error data ΔYuv is expressed by binary notation, the maximum number of bits becomes 7. In this way, the numbers of bits of the quantized error data ΔYuv, ΔCbuv, and ΔCruv are unambiguously determined by the quantization tables Q(Y)uv, Q(Cb)uv, and Q(Cr)uv. Thus, it is possible for the sum of the bits of the quantized error data ΔYuv, ΔCbuv, and ΔCruv (the total sum of the $B_y$, $B_{cb}$, and $B_{cr}$ obtained by equations (11) through (13), to exceed 11 bits.

Therefore, in this embodiment, when the sum of the $B_y$, $B_{cb}$, and $B_{cr}$ obtained by equations (11) through (13) exceeds 11 bits, the quantized error data ΔYuv, ΔCbuv, and ΔCruv are requantized by equations (14) through (16). These equations limit the number of bits such that their sum is limited to not more than 11 bits:

$$\Delta Y'uv = rol(\Delta Yuv/2^{(By-k)}) \quad (14)$$

$$\Delta Cb'uv = rol(\Delta Cbuv/2^{(BCb-m)}) \quad (15)$$

$$\Delta Cr'uv = rol(\Delta Cruv/2^{(BCr-n)}) \quad (16)$$

Here, k+m+n=11 and for example k=7 and m=n=2. Further, "rol" means to discard the portions after the decimal point.

Equations (14) through (16) show the simplest method of requantization of the quantized error data ΔYuv, ΔCbuv, and ΔCruv.

In step 108, the number of bits required for storing the quantized error data ΔYuv, ΔCbuv, and ΔCruv is allocated.

Among the luminance signals Y and the differential color signals Cb and Cr, the ones having the greater effect on the visual characteristics of the reproduced image are the luminance signals Y. Accordingly, the number of bits allocated for the error data ΔYuv of the luminance signals Y is made greater than the number of bits allocated for the error data ΔCbuv and ΔCruv for the differential color signals Cb and Cr. For example, the number of bits allocated for the error data ΔYuv of the luminance signals Y is 7 bits and the numbers of bits allocated for the error data ΔCbuv and ΔCruv of the differential color signals Cb and Cr are 2 bits each.

Figure 12:
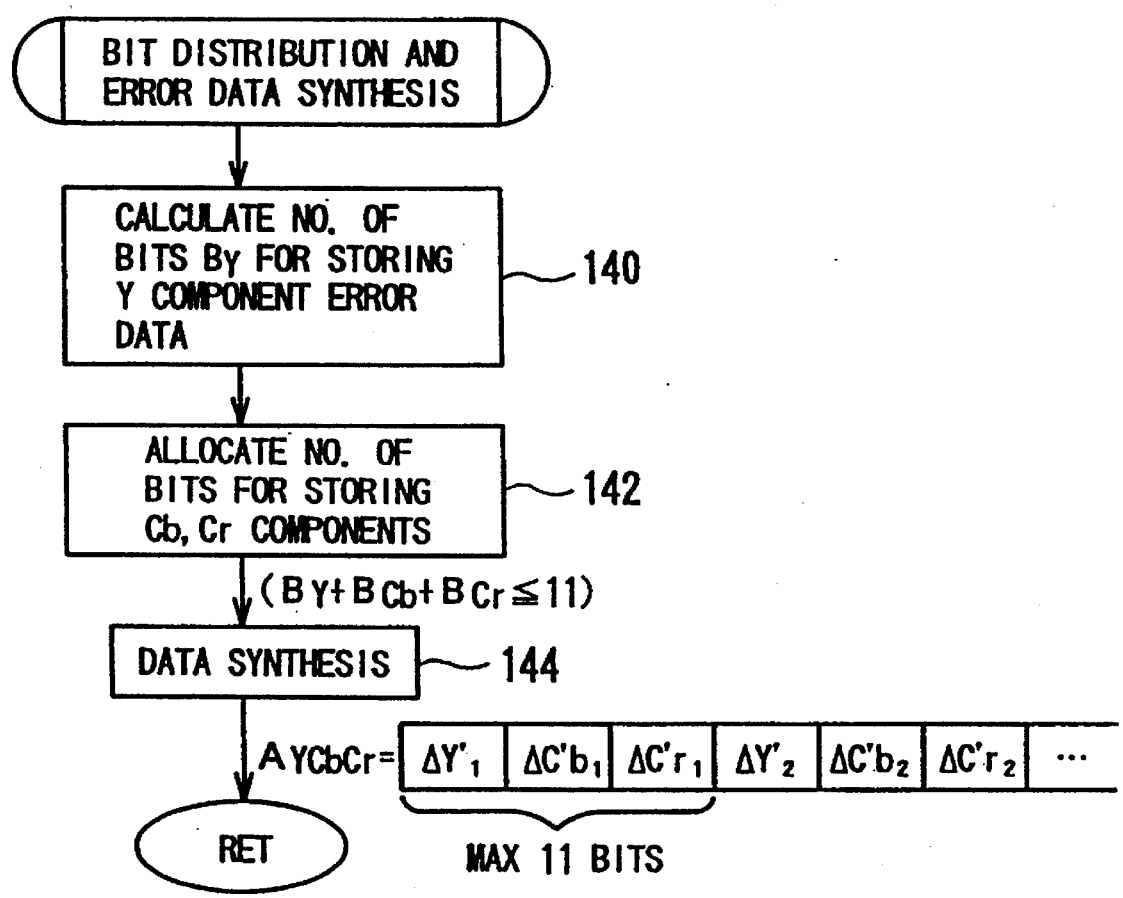
FIG. 12 is a flow chart of a first example of bit distribution and synthesis of error data.

FIG. 12 is a flow chart of a subroutine for bit distribution and synthesis of error data executed in step 108.

In step 140, the number of bits of the quantized error data ΔYuv, ΔCbuv, and ΔCruv are calculated by equations (11) through (13). When the sum of these bits is not greater than 11, or even when the sum is larger than 11 but the number of bits of the quantized error data ΔYuv of the luminance signals Y is not more than 7, the quantized error data ΔYuv is not requantized. However, when the sum of the bits is larger than 11 and the number of bits of the quantized error data ΔYuv is more than 7, the quantized error data ΔYuv is requantized by equation (14). That is, the number of bits for the quantized error data ΔYuv of the luminance signals Y is determined. Further, when the sum of the bits is larger than 11, but the number of bits of the quantized error data ΔYuv is not more than 7, only the quantized error data ΔCbuv and ΔCruv are requantized by equations (15) and (16).

In step 142, the numbers of bits for the quantized error data ΔCbuv and ΔCruv of the differential color signals Cb and Cr are allocated based on the number of bits for the quantized error data ΔYuv determined in step 140. For example, when the number of bits of the quantized error data ΔYuv is decided on as 7 in step 140, the numbers of bits of the quantized error data ΔCbuv and ΔCruv are requantized by equations (15) and (16) so as to become (11−7)/2=2.

In step 144, the quantized error data obtained in steps 140 and 142 are subjected to zigzag scanning (see FIG. 7) to produce the fourth component ΔKuv.

The fourth component ΔKuv is inputted to the Huffman encoding processing circuit 23 in step 109 of FIG. 2 and subjected to Huffman encoding in the same way as the Huffman encoding of the first through third components. In step 111, the Huffman encoded fourth component ΔKuv is recorded to the IC memory medium M in the form of data based on the JPEG format together with the encoded data of the first through third components.

Figure 13:
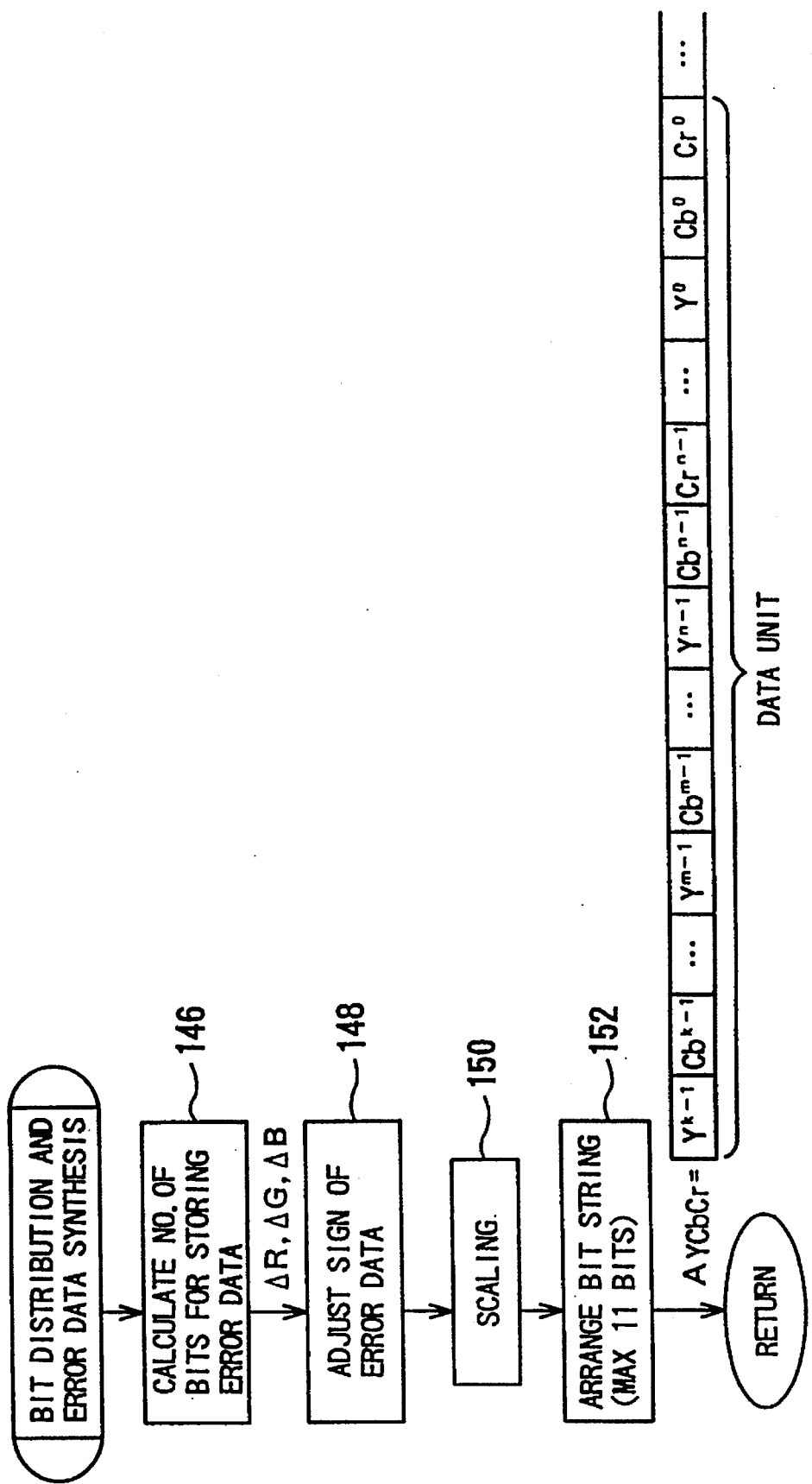
FIG. 13 is a flow chart of a second example of bit distribution and synthesis of error data.

FIG. 13 shows another flow chart of the subroutine for bit distribution and synthesis of error data.

In step 146, the number of bits of the quantized error data ΔYuv, ΔCbuv, and ΔCruv obtained in step 107 of FIG. 2 are calculated by equations (11) through (13). Based on the number of bit calculated, the number of bits of the quantized error data ΔYuv, ΔCbuv, and ΔCruv are determined by a technique similar to steps 140 and 142 of FIG. 12, so that the sum of the bits is not greater than 11 and the number of bits of the quantized error data ΔYuv of the luminance signals Y is the largest.

in step 148, to enable data compression to be performed more efficiently in the Huffman encoding of the quantized error data in step 109 in FIG. 2, the positive and negative signs of the quantized error data are adjusted. This adjustment is explained with reference to FIGS. 14A and 14B.

Figure 14A:
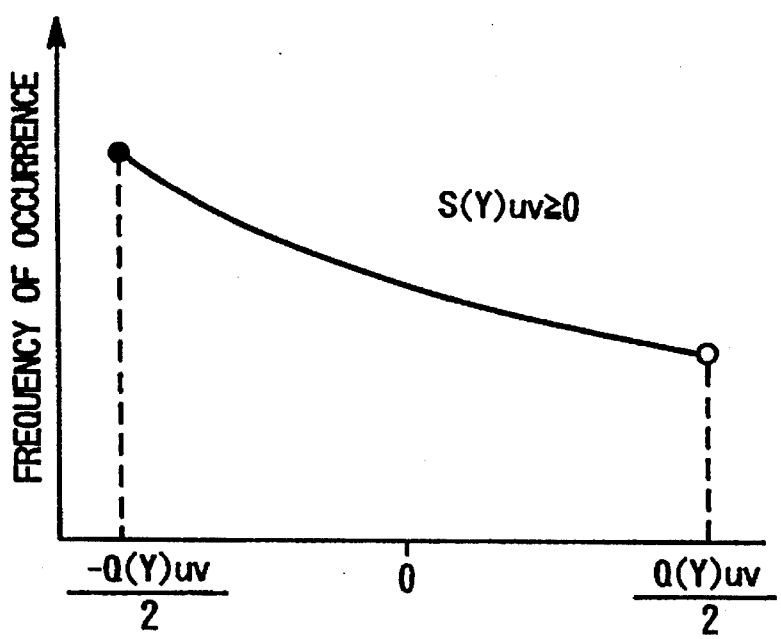
FIG. 14A and FIG. 14B are views of the histograms of the quantized error data Kuv.
Figure 14B:
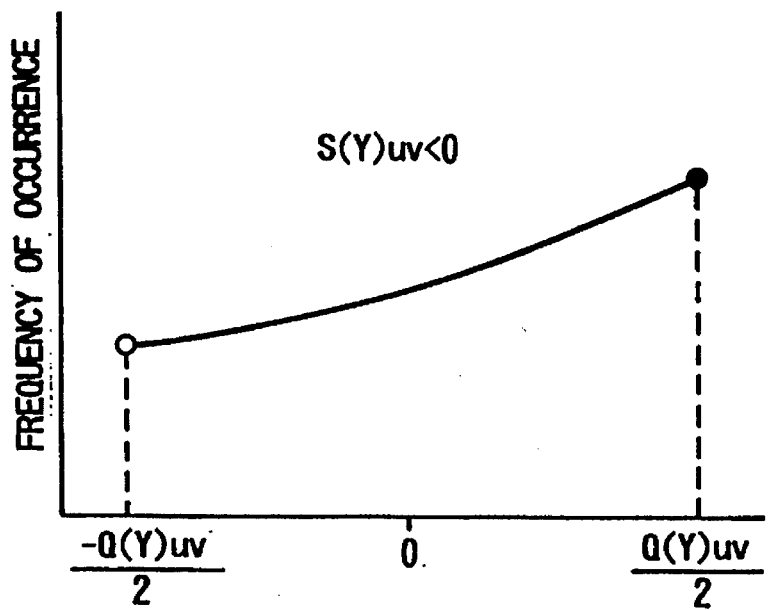

For example, when the original DCT coefficients S(Y)uv "95" to "104" are quantized by the quantization coefficient "10" the quantized DCT coefficient is "10" and the quantized error data Q(Y) uv/2 becomes "−5" to "4". On the other hand, the frequency of occurrence of the values of the original DCT coefficients becomes larger the smaller the absolute value of the figures, whether positive or negative. Accordingly, the distribution of the frequency of occurrence of the quantized error data (histogram), as shown in FIG. 14A, gradually declines from −Q(Y)uv/2 to Q(Y)uv/2. As opposed to this, for example, when the original DCT coefficients S(Y)uv "104" to "−95" are quantized by the quantization coefficient "10", the quantized DCT coefficient is "−10" and the quantized error data Q(Y)uv/2 becomes "−4" to "5". Therefore, the histogram of the quantized error data gradually increases from the larger absolute value to the smaller one of the original DCT coefficient, that is, from −Q(Y)uv/2 to Q(Y)uv/2, as shown in FIG. 14B.

In this way, the histogram of the quantized error data shows a reverse trend depending on the positive or negative sign of the value of the original DCT coefficient, and therefore, if the data obtained by zigzag scanning of the quantized error data is subjected to Huffman encoding, the entropy of the quantized error data is large, so the efficiency of data compression is not necessarily good.

Therefore, in step 148, to prevent the histogram of the quantized error data from reversing due to the positive or negative sign of the original DCT coefficient, when the original DCT coefficient is negative, the quantized error data of the DCT coefficient is multiplied by "−1". As a result, the frequency of occurrence of the values of the quantized error data becomes larger the smaller the absolute value without regard to the positive or negative sign of the values of the original DCT coefficient. Due to this, the entropy of the quantized error data becomes smaller in the Huffman encoding of the quantized error data in step 109 of FIG. 2 and the data compression is performed more efficiently.

In step 150, scaling is performed on the quantized error ΔYuv, ΔCbuv, and ΔCruv adjusted in sign in step 148. This "scaling" means to allocate a smaller code value the higher the frequency of occurrence in values of the sign adjusted quantized error data. For example, when quantizing the DCT coefficient S(Y)uv by the quantization table Q(Y)uv of FIG. 3, if the range of value of the quantized error data uv is −8 to 7, then −8Δ"0001", . . . 6Δ"1110" and 7Δ"1111".

In step 152, the bits of the quantized error data ΔY'uv, 'Cb'uv, and ΔCr'uv requantized in accordance with the bit allocation of step 146 are rearranged as follows:

For example, the number of bits of the quantized error data ΔY'uv, ΔCb'uv, and ΔCr'uv become 6, 3, and 2 bits due to requantization based on the bit allocation of step 146. Further, one of the data of the quantized error data ΔY'uv, ΔCb'uv, and ΔCr'uv is expressed as follows by a binary number:

Quantized error data ΔY'uv=Y(5)Y(4)Y(3)Y(2)Y(1)Y(0)

Quantized error data ΔCb'uv=Cb(2)Cb(1)Cb(0)

Quantized error data ΔCr'uv=Cr(1)Cr(0)

The bits of the quantized error data are rearranged so that the fourth component ΔKuv of the quantized error data for the quantized error data ΔY'uv, ΔCb'uv, and ΔCr'uv become $$\Delta Kuv = Y(5)Y(4)Y(3)Y(2)Cb(2)Y(1)Cb(1)Cr(1)Y(0)Cb(0)Cr(0)$$

Figure 15:
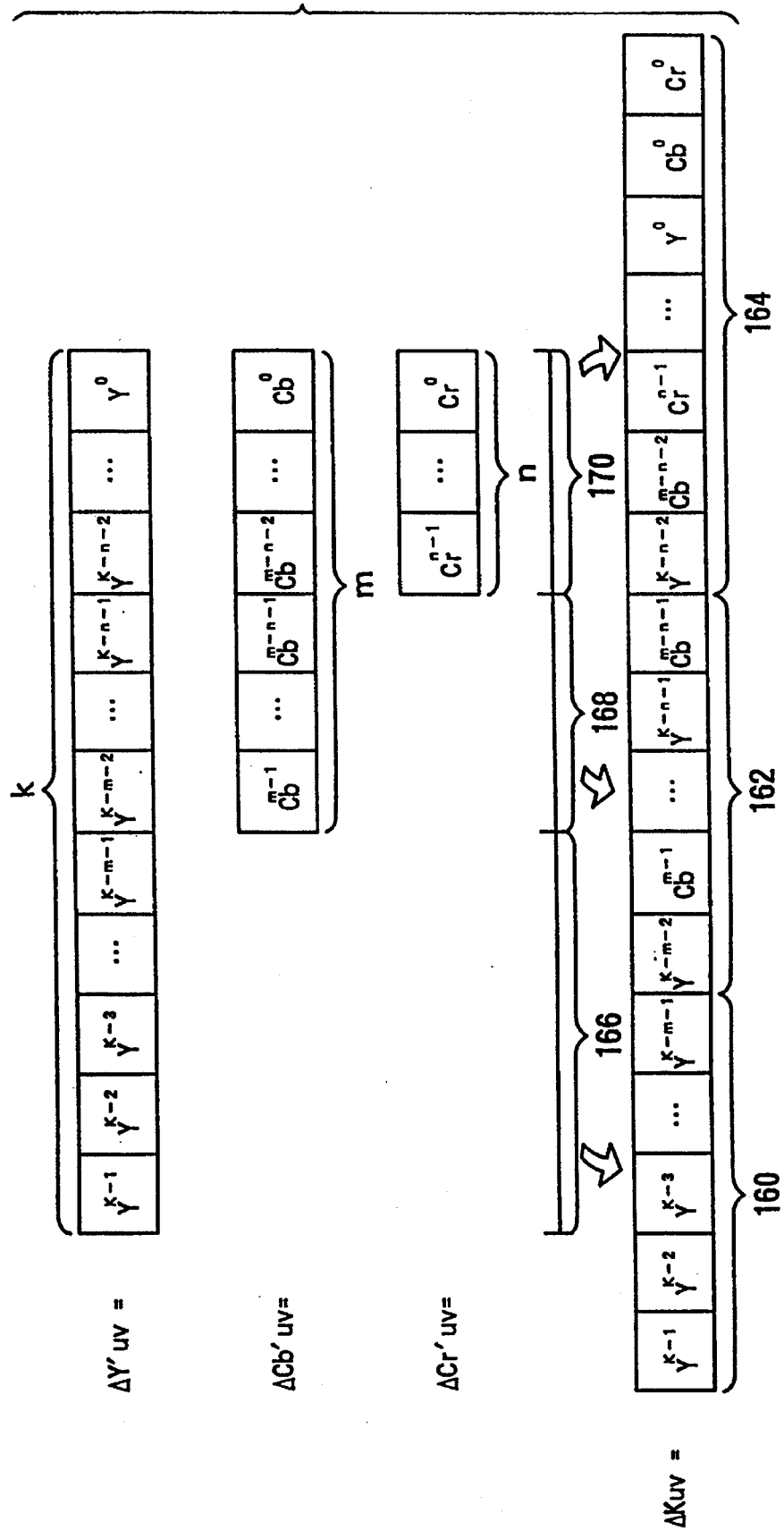
FIG. 15 is a view of the configuration of a fourth component Kuv.

Namely, when the number of bits of the quantized error data ΔY'uv, ΔCb'uv, and ΔCr'uv are k, ms and n (k≧m≧n, k+m+n= 11), respectively, as shown in FIG. 15, then the bit string 166 (topmost bit to (m+1) bit) of the header portion of the quantized error data ΔY'uv with the largest number of bits is arranged in the bit string 160 from the topmost bit to the (2m+n+1) bit of the fourth component ΔKuv.

In the bit string 162 ((2m+n) bit to (3n+1) bit) following the bit string 160, the bit string 168 from the m-th bit to the (n+ 1) bit of the quantized error data ΔY'uv and the bit string 168 from the topmost bit to the (n+1) bit of the quantized error data ΔCb'uv are alternately arranged in the order of Y and Cb. In the last bit string 164 ((3n) bit to bottommost bit) of the quantized error data ΔKuv, the bit string 170 from the n-th bit to the bottommost bit of the quantized error data ΔY'uv, the bit string 170 of the n-th bit to the bottommost bit of the quantized error data ΔCb'uv, and all of the bit string 170 of the quantized error data ΔCr'uv are arranged cyclically in the order of Y, Cb, and Cr.

Since in the scaling of step 150, the quantized error data ΔY'uv, ΔCb'uv, and ΔCr'uv are rearranged to smaller code values the higher the frequency of occurrence, the probability of the header bit of the quantized error data becoming 1 becomes lower. Further, in step 152, the bits in the same positions in the quantized error data ΔY'uv, ΔCb'uv, and ΔCr'uv are arranged in the order of Y, Cb, and Cr, the values of the fourth component become smaller. Accordingly, the entropies of the quantized error data ΔY'uv, ΔCb'uv, and ΔCr'uv of the fourth component ΔKuv become smaller and data compression comes to be performed more efficiently.

Note that the order or rearrangement of the bits in the production of the fourth component ΔKuv is such that the quantized error data with the larger number of bits necessarily come first. For example, in the case of FIG. 15, in the bit strings 162 and 164 of ΔKuv, since the numbers of bits of the quantized error data ΔY'uv, ΔCb'uv, and ΔCr'uv are k≧m≧n, the order necessarily becomes ΔY'uv, ΔCb'uv, and ΔCr'uv. Furthers in the case of the same numbers of bits, for examples, when the quantized error data ΔY'uv, ΔCb'uv, and ΔCr'uv are the same number of bits, Y'uv necessarily is disposed first and the order is made the same in all ΔKuv elements.

In step 109 of FIG. 2, the thus obtained fourth component ΔKuv is subjected to Huffman encoding by the Huffman encoding processing circuit 23 and is used together with the first to third Huffman encoded scan data outputted from the quantization processing circuit 22 to construct JPEG format image data 80 (see FIG. 10) which is then recorded to the IC memory card M (steps 110 and 111 in FIG. 2). Note that when incorporating the fourth component Kuv into the image data 80, data on the number of bits (k, m, and n) allowed to the quantized error data ΔY'uv, ΔCb'uv, and ΔCr'uv is also incorporated.

Figure 16:
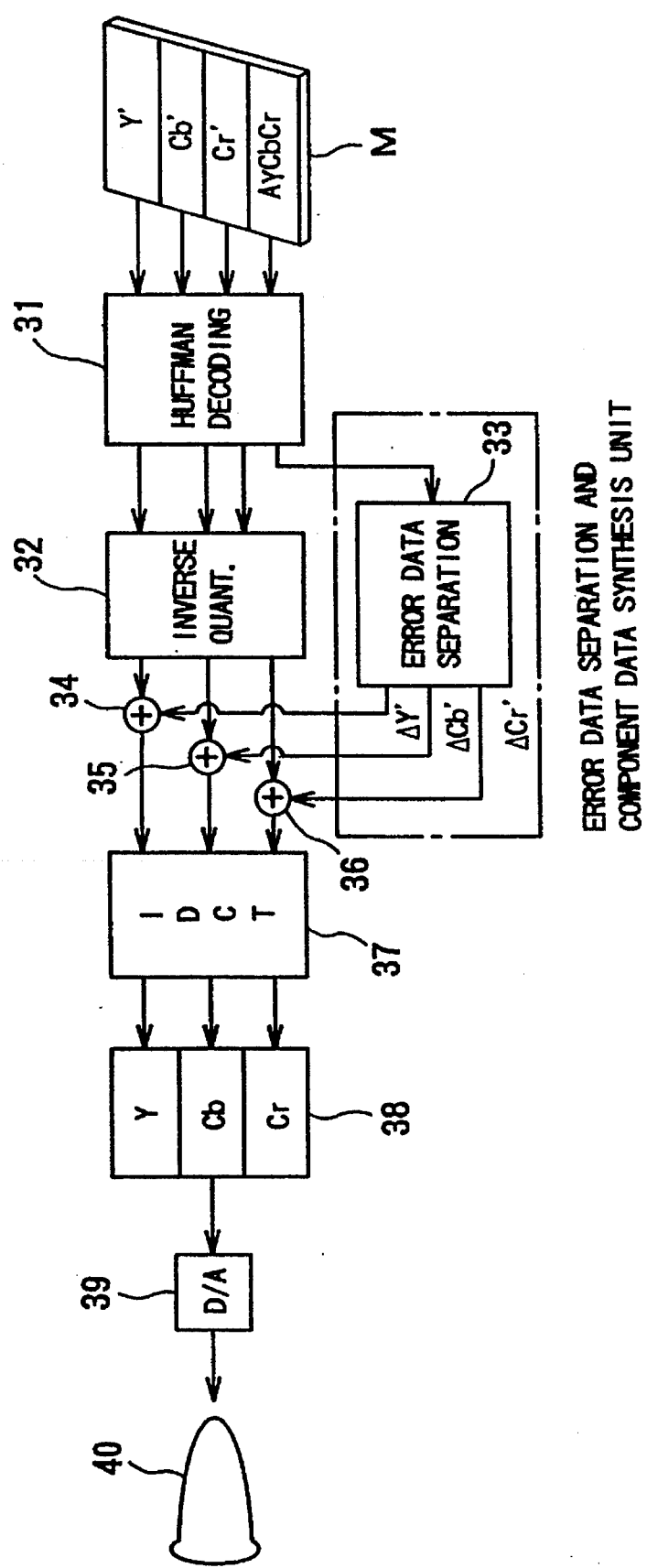
FIG. 16 is a block diagram of an image expansion device constituting a part of the image signal processing device of the first embodiment.

FIG. 16 is a block diagram of an image expansion device for reproducing an image from the image data 80 recorded to the IC memory card M by the data compression device of FIG. 1. The configuration and operation of the image expansion device will be explained using this figure and FIG. 10.

The image data 80 read out from the IC memory card M is inputted to the Huffman decoding processing circuit 31. In the Huffman decoding processing circuit 31, the first through fourth scan data 88a through 88d is extracted from the image data 80, along with the data on the Huffman encoding table used for the encoding of the scan data. Using the Huffman encoding table, the encoded data of the first scan data 88a, the second scan data 88b, and the third scan data 88c are decoded, and thus, the quantized DCT coefficients are obtained. Furthers the encoded data of the fourth scan data 88d is decoded, and thus, the quantized error data are obtained.

The quantized DCT coefficients are inputted to the inverse quantization processing circuit 32. In the inverse quantization processing circuit 32, the DCT coefficients are restored using the quantization tables incorporated into the image data 80 for each of the luminance signals Y and differential color signals Cb and Cr. The restored DCT coefficients are inputted to adders 34 to 36. Note that the quantization tables are recorded in the image data 80.

The quantized error data are inputted to the error data separation unit 33, where the quantized error data ΔY', ΔCb', and ΔCr' of the luminance signals Y and differential color signals Cb and Cr are separated from each other. These are then inputted to the adders 34 to 36. In the adders 34 to 36, the quantized error data ΔY', ΔCb', and ΔCr' are added to the restored DCT coefficients of the luminance signals Y and the differential color signals Cb and Cr inputted from the inverse quantization processing circuit 32. The data obtained by this addition is subjected to two-dimensional inverse DCT transformation for each block of 8×8 pixels in the IDCT processing circuit 37 so as to reproduce the luminance signals Y and the differential color signals Cb and Cr of the original image.

The luminance signals Y and differential color signals Cb and Cr of the original image data are divided into blocks of 8×8 pixels and inputted to the image memory 38. When one image's worth of data is finished being stored in the image memory 38, the data of the luminance signals Y and the differential color signals Cb and Cr are simultaneously read out by the same scanning method as ordinary video signals, inputted to the D/A converter 39, and converted into analog format video signals. The analog luminance signals Y and differential color signals Cb and Cr are converted to composite video signals etc. by a circuit, not shown, when necessary and then outputted to a display 40.

Figure 17:
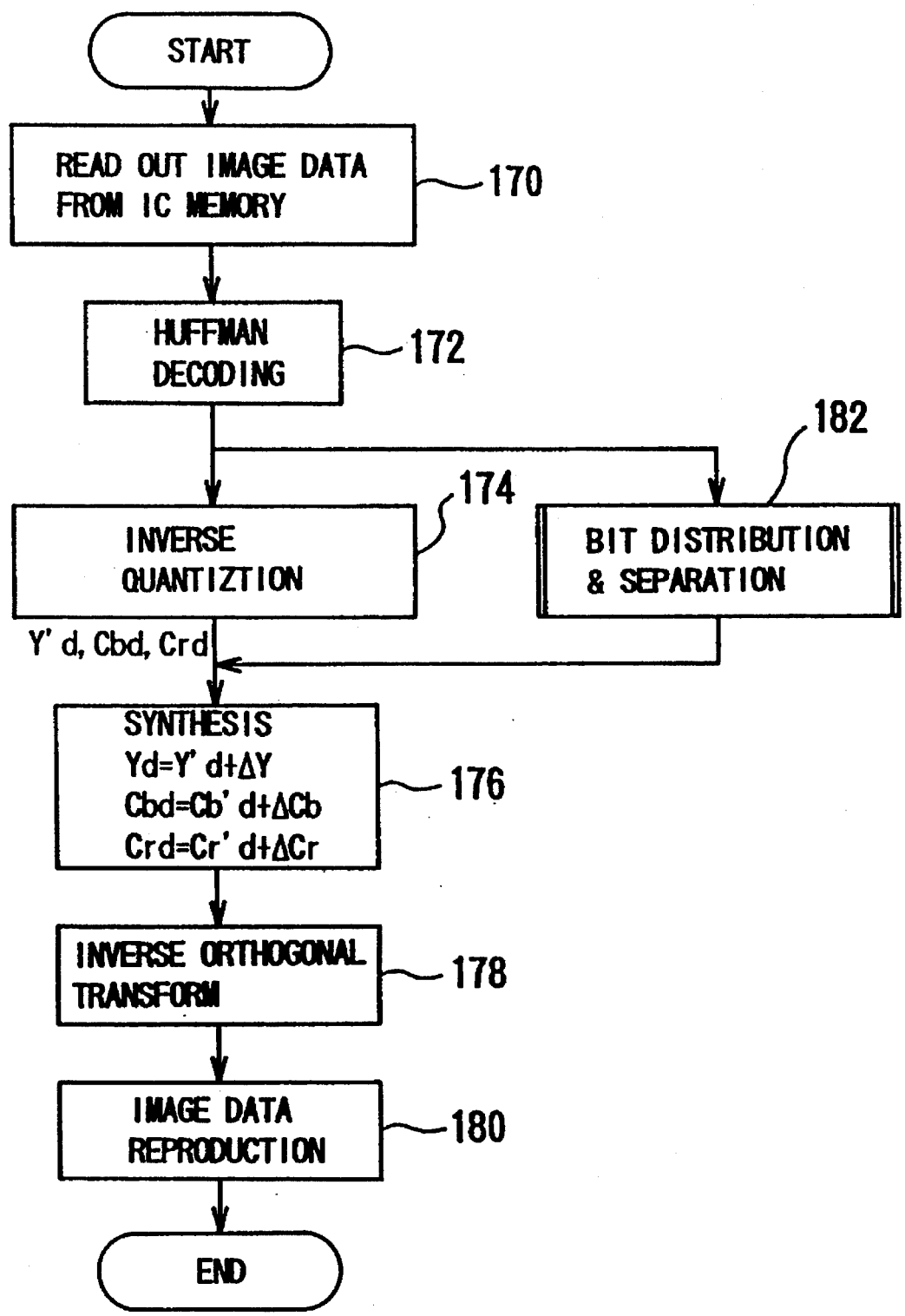
FIG. 17 is a flow chart of an image expansion processing.
Figure 18:
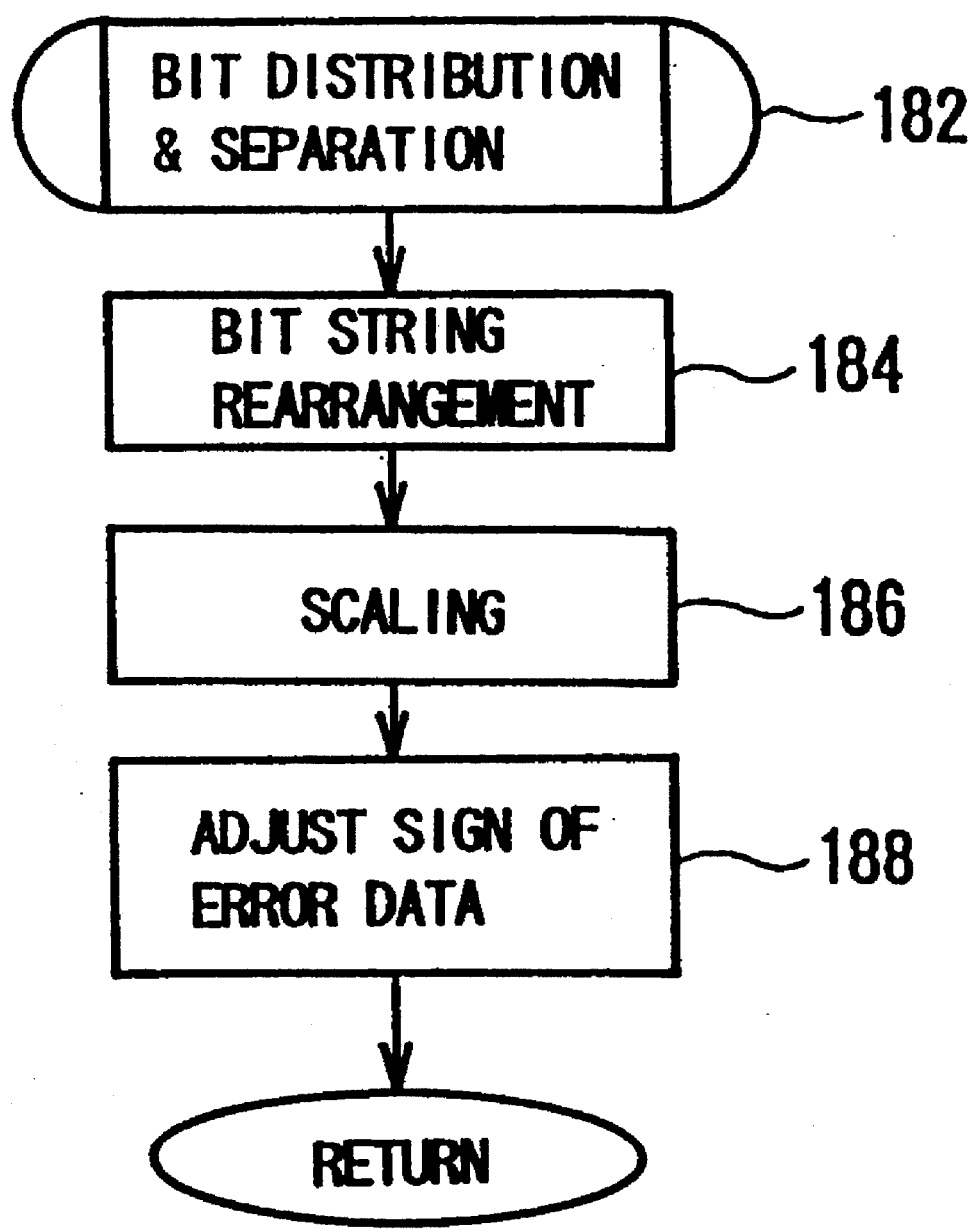
FIG. 18 is a flow chart of processing for finding error data in the image expansion processing.

An explanation will be made of the operation of the image expansion device shown in FIG. 16 using the flow chart of FIG. 17 and FIG. 18 and FIG. 11.

In step 170, the image data 80 is read out from the IC memory card M. The first to third components of the image data 80 are inputted to the Huffman decoding processing circuit 31 in step 172, where the quantized DCT coefficients R'(Y)uv, R'(Cb)uv, and R'(Cr)uv constituted by the 8×8 pixel blocks are decoded (see FIG. 11). The quantized DCT coefficients R'(Y)uv, R'(Cb)uv, R'(Cr)uv are inputted to the inverse quantization processing circuit 32 in step 174, where they are inversely quantized using the quantization tables incorporated in the image data 80. By this, the DCT coefficients S'(Y)uv, S'(Cb)uv, and S'(Cr)uv are reproduced (see FIG. 11).

The fourth component ΔKuv decoded by the Huffman decoding processing circuit 31 is inputted to the error data separation unit 33 in step 182. In the error data separation unit 33, the quantized error data ΔY'uv, ΔCb'uv, and ΔCr'uv are obtained. In step 182, further, when the quantized error data are requantized, inverse quantization is performed to reproduce the quantized error data ΔY"uv, ΔCb"uv, and ΔCr"uv.

The reproduction of the quantized error data ΔY"uv, ΔCb"uv, and ΔCr"uv will now be explained using the flow chart of the processing routine shown in FIG. 18.

In step 184, the bit strings of the fourth component ΔKuv having the form shown in FIG. 15 are rearranged for the luminance signals Y and the differential color signals Cb and Cr based on the number of bits (k, m, and n) allocated to the quantized error data incorporated in the image data 80, and quantized error data ΔY"uv, ΔCb"uv, and ΔCr"uv are extracted. In step 186, the quantization tables incorporated into the image data 80 are used to correct the scaling performed in step 150 of FIG. 13. For example, consider the case where the quantized error data ΔY'uv is changed from 8 bits to 6 bits by requantization using equation (14) and further where the decoded data is "000000". When the quantization coefficient $Q_y$=245 and the quantized error ΔYuv>0, "000000" means the requantized error is the smallest (when negative the absolute value is the largest), and the requantized error data is $$\Delta Y"uv = -Q_y/2/2^2 = -30$$

Accordingly, the quantized error data ΔY'uv before the requantization multiplies "4" by "−30" to correct from 6 bits to 8 bits, whereby −120 is obtained.

After scaling correction, in step 188, the quantized error data ΔY"uv, ΔCb"uv, and ΔC"uv are obtained based on the $B_y$, $B_{cb}$, and $B_{cr}$ obtained by equations (11) to (13) and the numbers of bits (k, m, and n). When a quantization of the quantized error data ΔYuv, ΔCbuv, and ΔCruv has been performed, and an inverse quantization is performed, quantized error data ΔY"uv, ΔCb"uv, and ΔCr"uv are obtained. Further, the signs of the quantized error data ΔY"uv, ΔCb"uv, and ΔCr"uv are corrected based on the positive and negative signs of the DCT transformation coefficients S'(Y)uv, S'(Cb)uv, and S'(Cr)uv obtained by the inverse quantization processing circuit 32.

Referring to FIG. 17 once again in step 176, the quantized error data ΔY"uv, ΔCb"uv, and ΔCr"uv obtained in step 188 are inputted to the adders 34, 35, and 36, where they are added to the restored DCT coefficients S'(Y)uv, S'(Cb)uv, and S'(Cr)uv from the inverse quantization processing circuit 32. The results of the addition, DCT coefficients S'(Y)uv, S'(Cb)uv, and S'(Cr)uv, are subjected to the inverse discrete cosine transformation expressed by the following equation (17) for each block of 8×8 pixels in step 178, whereby the image data P'(Y)xy, P'(Cb)xy, and P'(Cr)xy are reproduced (see FIG. 11):

$$P'(Y)xy = \frac{1}{4} \sum_{u=0}^{7} \sum_{v=0}^{7} CuCvS'(Y)uv \cos\frac{(2x+1)u\pi}{16} \cos\frac{(2y+1)v\pi}{16} + Ls \quad (17)$$

where, x,y=position of pixel in block u,v=position of DCT coefficient

Cu,Cv=$1/\sqrt{2}$; u,v=0

=1; otherwise

Ls=128; bit precision of Pxy=8 bits

The restored image data P'(Y)xy, P'(Cb)xy, and P'(Cr)xy are successively written and stored into the image memory 38 in blocks. When one image's worth of image data is stored in the image memory 38, in step 180, the image data is read out from the image memory 28 in the same order as the writing of the original image data to the image memory 14 of FIG. 1. The data is converted to video signals of the analog format at the D/A converter 39, and the results are displayed on the display 40.

As described above, this embodiment stores the original image data lost due to the quantization or DCT transformation in the fourth component of the JPEG format and records the same to the IC memory card M. Accordingly, it is possible to produce an image even by a device reproducing an image using just the first to third components and, in the case of the reproducing device shown in FIG. 16, a higher quality image can be reproduced.

Further, in this embodiment, the error data stored in the fourth component has the most bits allocated to the luminance signals Y, which have the greatest effect on the visual characteristics of a reproduced image, so it is possible to further reduce the image degradation accompanying image compression. Further, processing is performed so as to reduce the entropy of the fourth component even more, so it is possible to hold to a minimum the amount of memory occupied to the IC memory card hi along with an increase of the fourth component.

Figure 19:
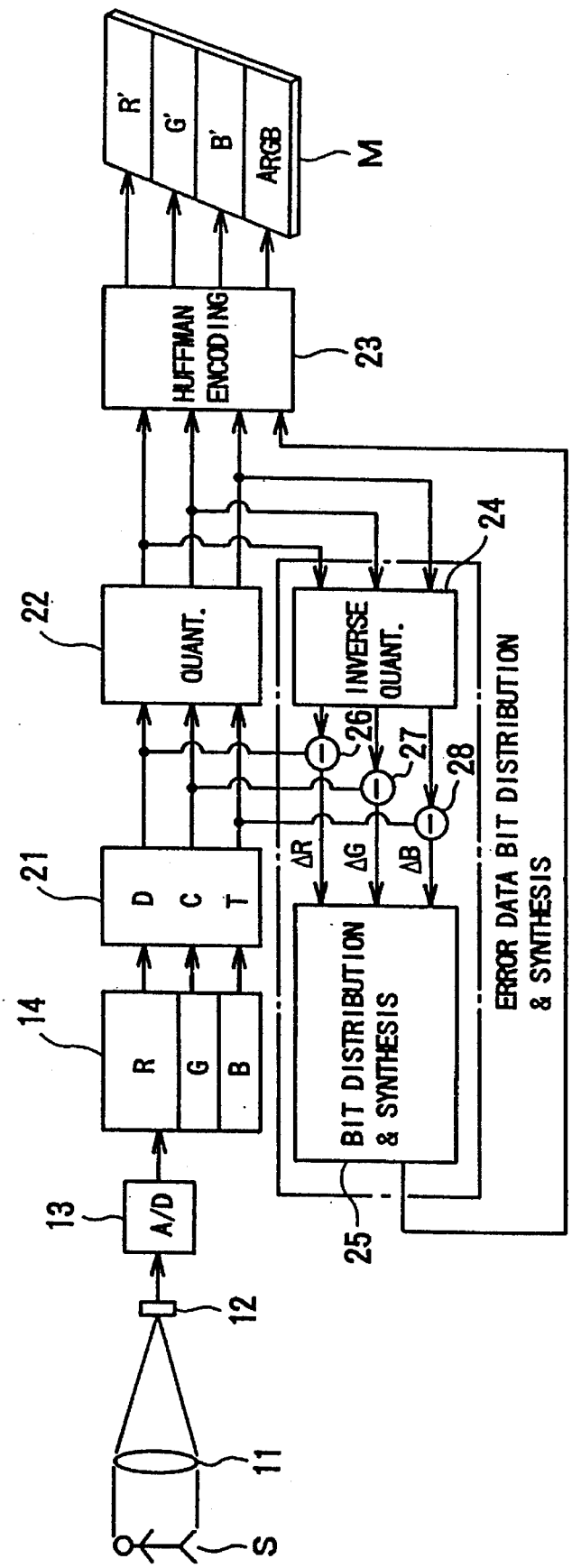
FIG. 19 is a block diagram of an image compression device constituting a part of the image signal processing device of a second embodiment.

FIG. 19 is a block diagram of an image compression device constituting a part of the image signal processing device of a second embodiment.

In the second embodiment, unlike the first embodiment of FIG. 1, the color signals R, G, and B outputted from the A/D converter 13 are stored as they are in the image memory 14. In the DCT processing circuit 21, the quantization processing circuit 22, the inverse quantization processing circuit 24, the error data synthesizing unit 25, and the Huffman encoding processing circuit 23, the color signals R, G, and B are encoded and recorded to the IC memory card M. Note that the processing at the DCT processing circuit 21, quantization processing circuit 22, inverse quantization processing circuit 24, error data synthesizing unit 25, and Huffman encoding processing circuit 23 is similar to that in the first embodiment.

Figure 20:
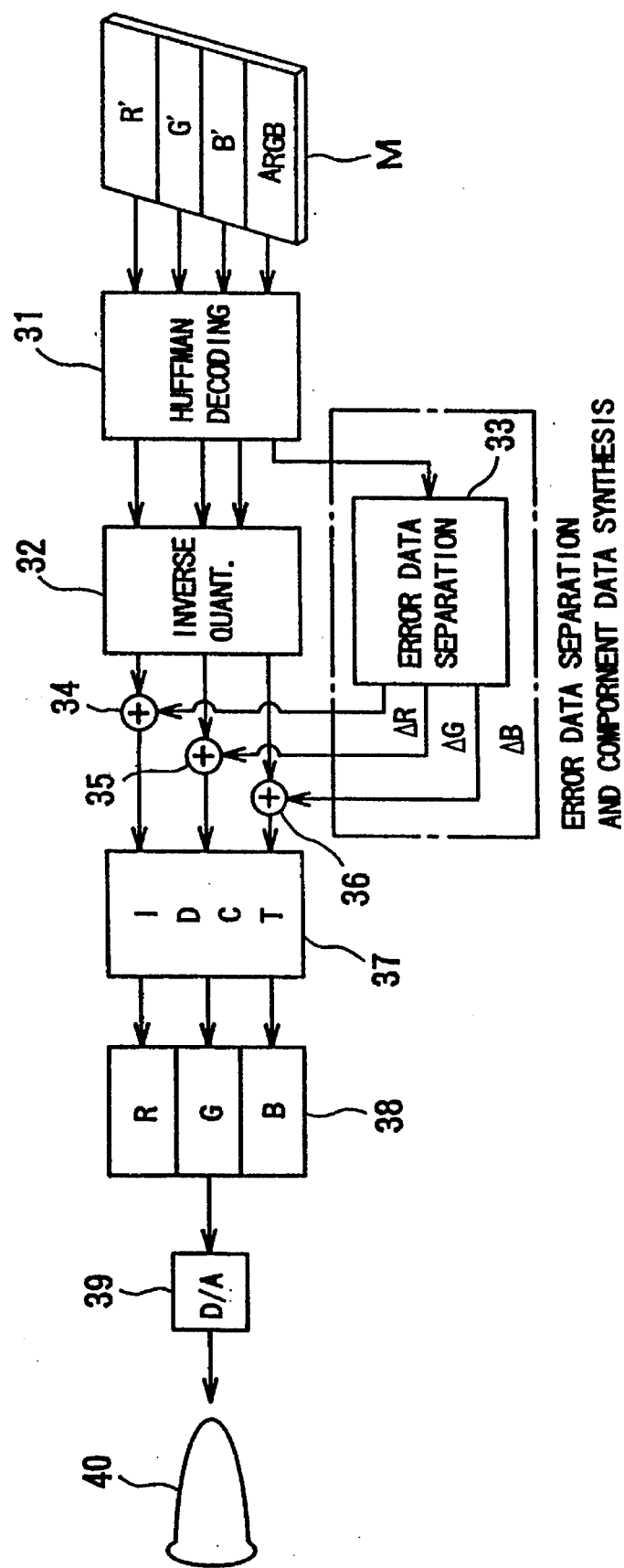
FIG. 20 is a block diagram of an image expansion device constituting a part of the image signal processing device of the second embodiment.

FIG. 20 is a block diagram of an image expansion device of the second embodiment.

In this image expansion device, an image constituted by the color signals R, G, and B is reproduced from the image data 80 of the JPEG format recorded to the IC memory card M by the image compression device of FIG. 19. Note that in this figure the same reference numerals are given to circuits corresponding to the circuits of the image expansion device of the first embodiment of FIG. 1.

The image expansion device of the second embodiment is the same as the first embodiment except for the point of processing of the color signals R, G, and B.

Figure 21:
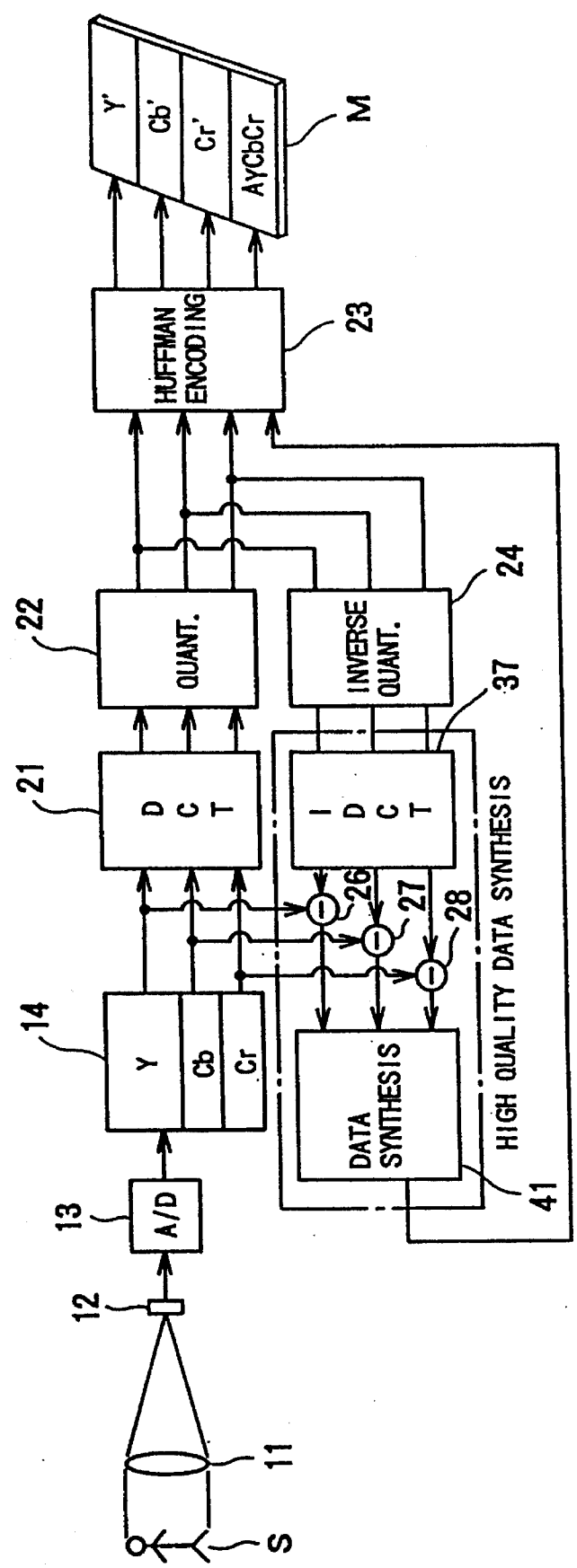
FIG. 21 is a block diagram of an image compression device constituting a part of the image signal processing device of a third embodiment.

FIG. 21 is a block diagram of an image compression device constituting a part of the image signal processing device of a third embodiment. In the figure, circuits the same as in the first embodiment and second embodiment are given the same reference numerals.

In the third embodiment, the quantized error data stored in the fourth component of the JPEG format is obtained from the difference between the original image data before the DCT transformation and the image data reproduced from the quantized DCT coefficients after DCT transformation and quantization. In other words, the information of the original image data lost due to the DCT transformation and quantization is stored in the fourth component as the error data.

Namely, the data of the luminance signals Y and the differential color signals Cb and Cr of the original image read out from the image memory 14 are processed by the DCT processing circuit 21 and the quantization processing circuit 22, then inputted to the inverse quantization processing circuit 24 as the quantized DCT coefficients. The quantized DCT coefficients are processed by the inverse quantization processing circuit 24 and the IDCT processing circuit 37 and are inputted to the subtractors 26, 27, and 28 as the reproduced image data of the luminance signals, and the differential color signals Cb and Cr. On the other hand, the luminance signals Y and the differential color signals Cb and Cr of the original image data read out from the image memory 14 are inputted to the subtractors 26, 27, and 28. Accordingly, the error data of the difference between the original image data and the reproduced image data is obtained for each pixel.

In the data producing unit 41, the error data of the luminance signals Y and the differential color signals Cb and Cr are quantized when necessary in the same way as in the first and second embodiments and are rearranged and converted to the fourth component of 11 bit fixed length data and then inputted to the Huffman encoding processing circuit 23. The error data Huffman encoded to the Huffman encoding processing circuit 23 are stored in the IC memory card M as the fourth scan data of the JPEG format.

Figure 22:
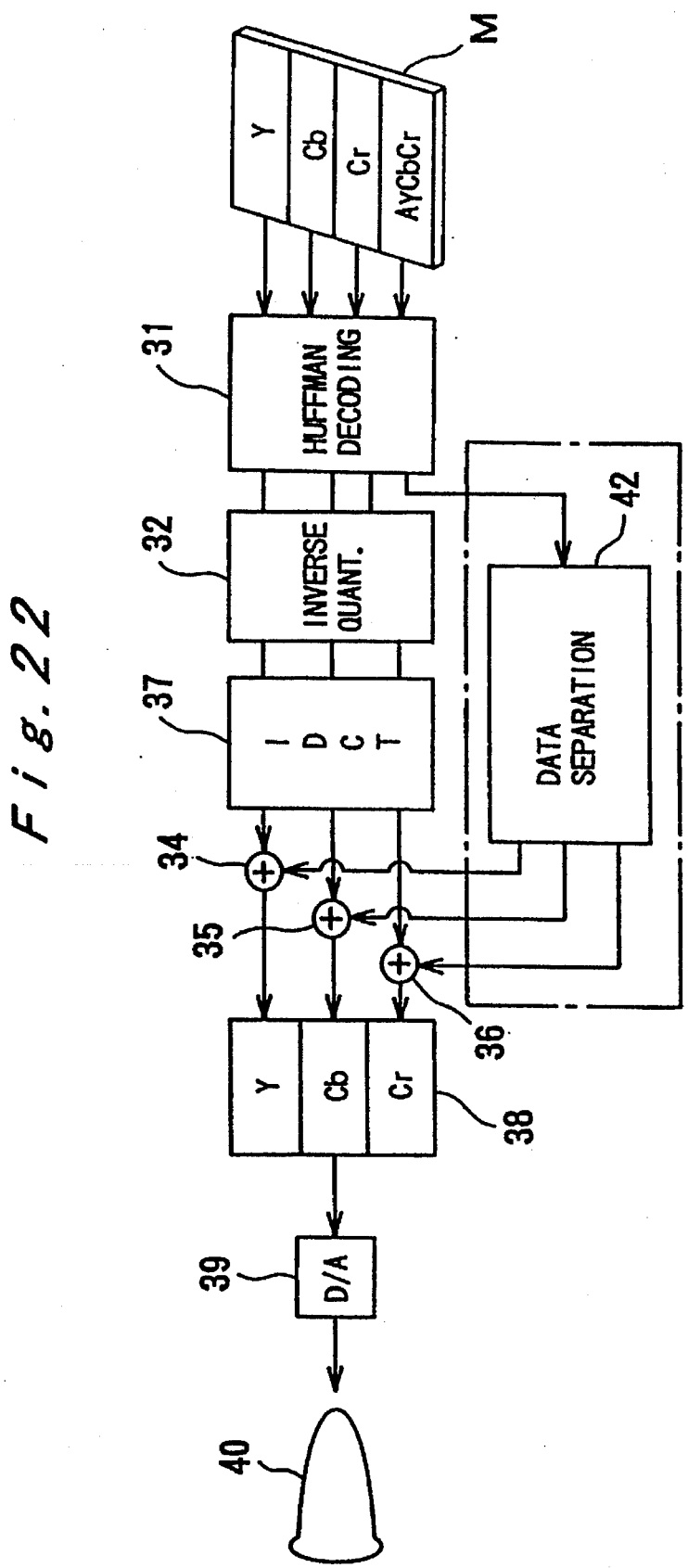
FIG. 22 is a block diagram of an image expansion device constituting a part of the image signal processing device of the third embodiment.

FIG. 22 is a block diagram of an image expansion device constituting a part of the image signal processing device of the third embodiment.

The scan data of the JPEG format read out from the IC memory card M are processed at the Huffman decoding processing circuit 31 to decode the quantized DCT coefficients and error data of the luminance signals Y and the differential color signals Cb and Cr. The quantized DCT coefficients are reproduced based on the quantization table information incorporated into the image data 80 at the inverse quantization processing circuit 32, and then inputted to the IDCT processing circuit 37 as reproduced DCT coefficients. The reproduced DCT coefficients are subjected to inverse DCT transformation at the IDCT processing circuit 37, so that the luminance signals, and the differential color signals Cb and Cr are obtained. These luminance signals Y and differential color signals Cb and Cr are inputted to the adders 34, 35, and 36. On the other hand, the error data outputted from the Huffman decoding processing circuit 31 are separated into the error data of the luminance signals Y and the differential color signals Cb and Cr for each pixel position at the data separation unit 42, which data are then inputted to the adders 34, 35, and 36.

In the adders 34, 35, and 36, the luminance signals Y and the differential color signals Cb and Cr and the corresponding error data are added and successively written in the image memory 38. When one image's worth of the luminance signals Y and the differential color signals Cb and Cr are stored in the image memory 38, like with the first and second embodiments, they are converted to analog signals in the D/A converter 39 and outputted to the display 40.

Figure 23:
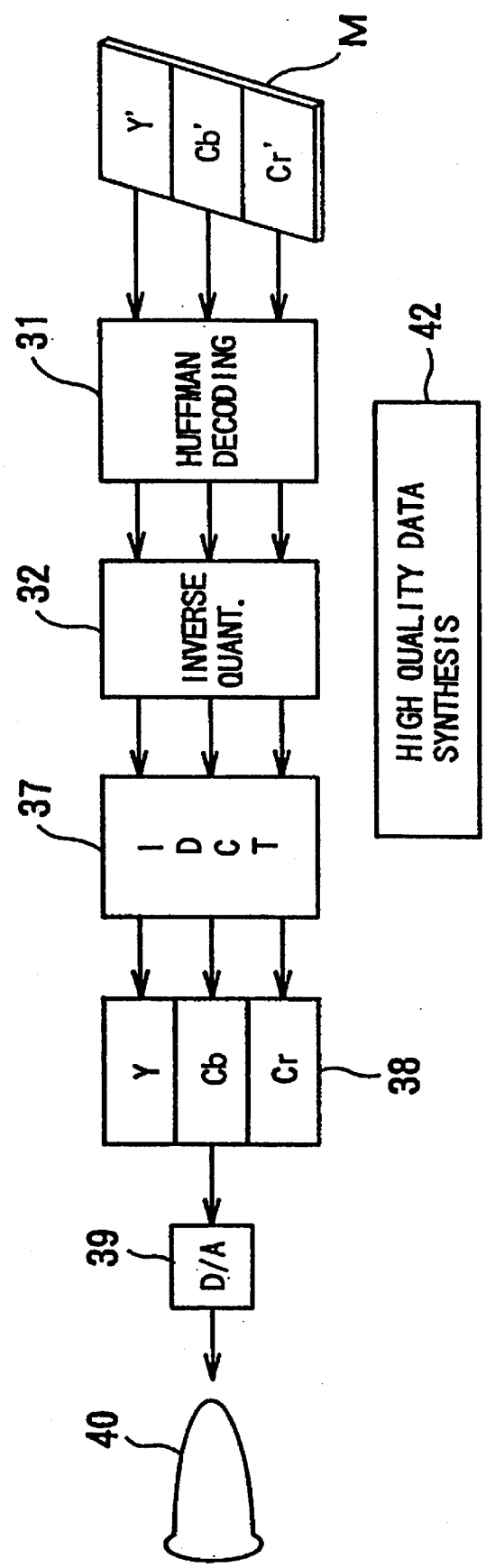
FIG. 23 is a block diagram of a device for reproducing an image without using error data of a fourth component Kuv.

FIG. 23 is a block diagram of an image expansion device for reproducing an image without using quantized error data from the first, second, and third components of the image data 80 recorded to the IC memory card M by the image compression devices of the firsts second, and third embodiments.

In the image expansion device of FIG. 23, just the first through third scan data 88a, 88b, and 88c of the image data 80 read out from the IC memory card M are separated and inputted to the Huffman decoding processing circuit 31. In the Huffman decoding processing circuit 31, the quantized DCT coefficients are reproduced from the scan data 88a to 88c in the same way as in the first, seconds and third embodiments and are inputted to the inverse quantization processing circuit 32. The quantized DCT coefficients inputted to the inverse quantization processing circuit 32 are reproduced to the DCT coefficients using the quantization tables and then are inputted to the IDCT processing circuit 37. In the IDCT processing circuit 37, the DCT coefficients are subjected to inverse DCT transformation for each block of 8×8 pixels to reproduce the luminance signals Y and differential color signals Cb and Cr of the image data. These signals are successively inputted to the image memory 38. When one image's worth of signals are stored in the image memory 38, they are converted to analog signals in the D/A converter 39, which are then outputted to the display 40.

In the first through third embodiments, when the sum of the maximum number of bits $B_y$, $B_{cb}$, and $B_{cr}$ able to be taken by the quantized error data $\Delta Yuv$, $\Delta Cbuv$, and $\Delta Cruv$ exceeds 12 bits for the quantized error data of the DC component or exceeds 11 bits for the quantized error data of the AC component, the number of bits of the quantized error data are adjusted based on equations (14) through (16). For example, as shown in FIG. 24A, for the luminance signals Y, the maximum value of the quantization coefficient of the quantization table $Q(Y)uv$ is "121". All of the constituent elements of the quantized error data $\Delta Yuv$ are requantized based on equation (11) so that the number of bits becomes 7 bits.

On the other hand, for example, for a quantization coefficient "16", the number of bits of the quantized error data Yuv is 4 bits. Seven bits are not necessary to store this. Namely, the values of the quantization coefficients differ tremendously and quantization coefficients with small values may be requantized to be made small in numbers of bits. Accordingly, the efficiency of utilization of the fourth component of the JPEG format may be further improved over the first to third embodiments. The fourth and fifth embodiments described below have configurations for enabling even more efficient utilization of the fourth component.

Figure 25:
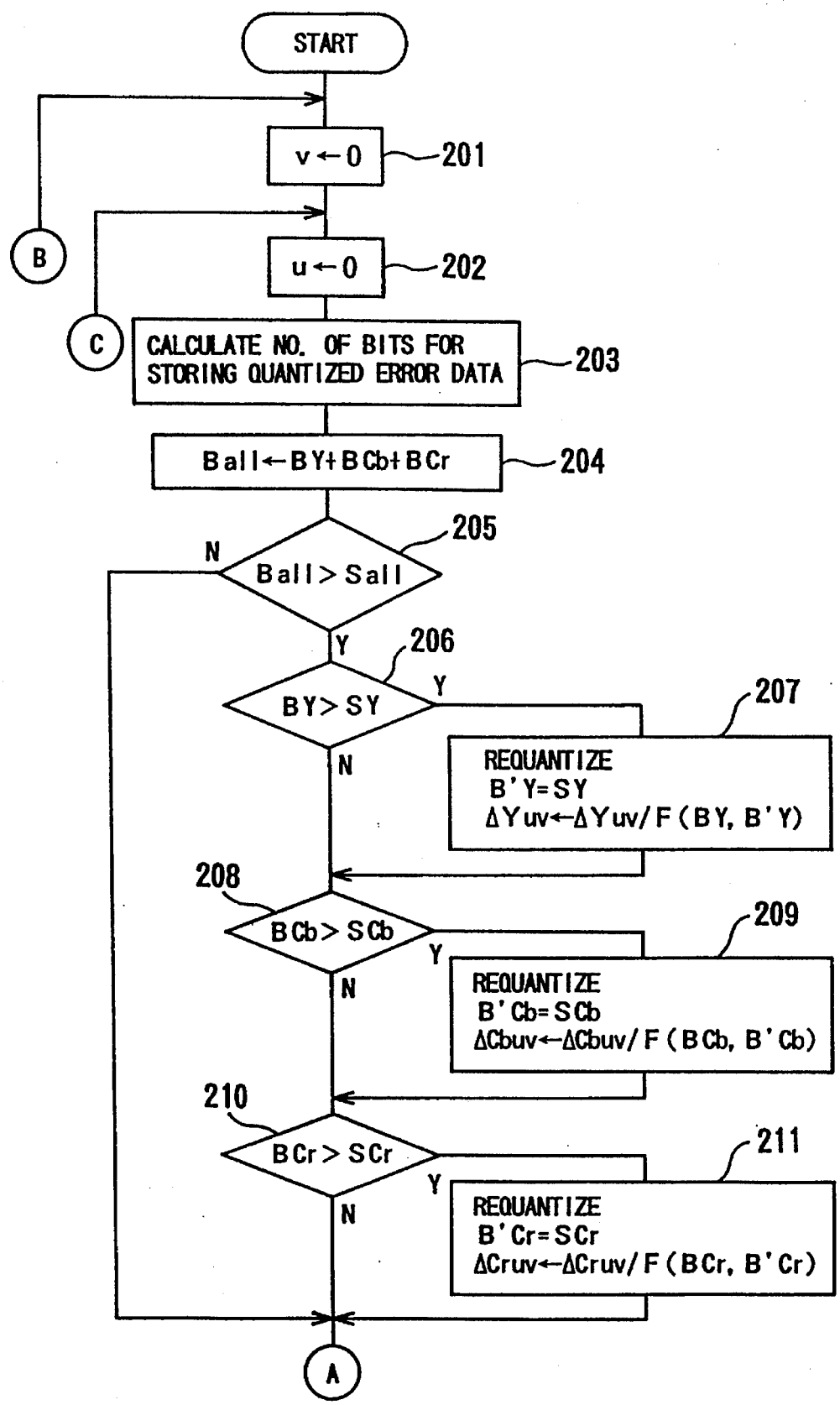
FIG. 25 is a flow chart of a processing routine for producing quantized error data in a fourth embodiment.
Figure 26:
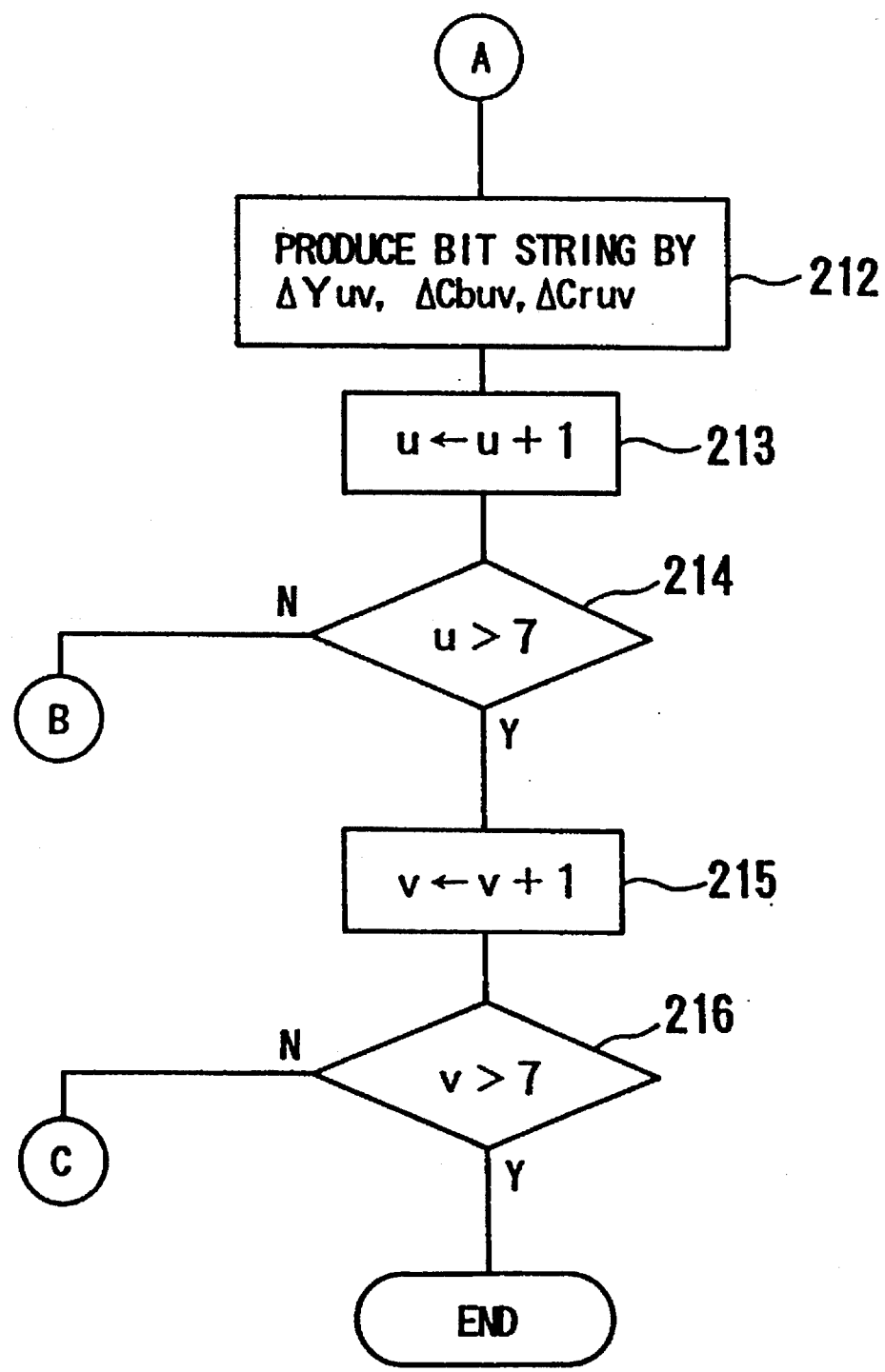
FIG. 26 is a flow chart of a processing routine for producing quantized error data in the fourth embodiment.

FIG. 25 and FIG. 26 are flow charts of the processing routine for producing the quantized error data in the fourth embodiment.

In step 201, the parameter v is determined as "0" and in step 202 the parameter u is determined as "0". The parameters u and v show the component positions in the horizontal direction and vertical direction of the quantization tables shown in FIGS. 24A and 24B and take values of "0" to "7". The DC component is stored at the component positions where the parameters u and v are both "0" in the quantization tables, while the AC component is stored at the other component positions.

In step 203, the number of bits $B_y$, $B_{cb}$, and $B_{cr}$ required for storing the quantized error data $\Delta Yuv$, $\Delta Cbuv$, and $\Delta Cruv$ are calculated in the same way as in the first embodiment using equations (11) to (13). In the case of the DC component of the quantization tables shown in FIGS. 24A and 24B, the quantization coefficients $Q(Y)_{00}=16$ and $Q(Cb)_{00}=Q(Cr)_{00}=17$, so as shown in FIG. 28, the required number of bits become $B_y=4$ and $B_{cb}=B_{cr}=5$. In step 204, the sum $B_{all}$ of the required numbers of bits $B_y$, $B_{cb}$, and $B_{cr}$ is calculated. In the case of the DC components of FIGS. 24A and 24B, the sum of the required number of bits $B_{all}$ is "14". Step 205 determines whether the sum $B_{all}$ is larger than the sum $S_{all}$, where $S_{all}$ is the set number of bits $S_y$ allocated to the quantized error data $\Delta Yuv$ plus the set number of bits $S_{cb}$ allocated to the quantized error data $\Delta Cbuv$ plus the set number of bits $S_{cr}$ allocated to the quantized error data $\Delta Cruv$. The sum $S_{all}$ of the set number of bits is "11" in the case of the AC component and "12" in the case of the DC component. Accordingly, in the case of the DC component of FIGS. 24A and 24B, the sum $B_{all}$ of the required numbers of bits is "14", which is larger than the sum $S_{all}$ of the set numbers of bits, so step 206 is executed, where it is determined whether the required numbers of bits $B_y$, $B_{cb}$, and $B_{cr}$ are larger than the set number of bits $S_y$, $S_{cb}$, and $S_{cr}$.

Note that as the bit distribution of the quantized error data, for the DC component, for example, the set number of bits $S_y$ of the quantized error data $\Delta$Yuv is determined as "6" and the set number of bits $S_{cb}$ and $S_{cr}$ of the quantized error data $\Delta$Cbuv and $\Delta$Cruv are determined as "3" respectively. Further, for the AC component, for example, the set number of bits $S_y$ of the quantized error data $\Delta$Yuv is determined as "5" and the set numbers of bits $S_{cb}$ and $S_{cr}$ of the quantized error data $\Delta$Cbuv and $\Delta$Cruv are determined as "3" respectively.

Step 206 determines whether the required number of bits of the quantized error data $\Delta$Yuv is larger than the set number of bits $S_y$. In the case of the DC component of FIG. 24A, $B_y=4$ and $S_y=6$, so the required number of bits is smaller and requantization is not necessary.

Accordingly, in this case the routine proceeds to step 208, where it is determined whether the required number of bits $B_{cb}$ of the quantized error data $\Delta$Cbuv is larger than the set number of bits $S_{cb}$. In the case of the DC component of FIG. 24B, $B_{cb}=5$ and $S_{cb}=3$, so the required number of bits is larger. Accordingly in this cases requantization is performed in step 209. That is, the set number of bits $S_{cb}$ is determined as the maximum number of bits $B'_{cb}$ of the quantized error data $\Delta$Cbuv, and the quantized error data $\Delta$Cbuv is divided by the requantization coefficient $F(B_{cb}, B'_{cb})$ to be requantized. The requantization coefficient $F(B_{cb}, B'_{cb})$ has a quantization value for changing the number of bits of the quantized error data $\Delta$Cbuv from $B_{cb}$ to $B'_{cb}$. In the case of the DC component of FIG. 24B, it is changed from 5 bits to 3 bits, as shown by the symbol F1 in FIG. 27, the requantization coefficient $F(B_{cb}, B'_{cb})$ is determined as "5".

Step 210 determines whether the required number of bits $B_{cr}$ of the quantized error data $\Delta$Cruv is larger than the set number of bits $S_{cr}$. Processing similar to the quantized error data $\Delta$Cbuv is performed. That is, in the case of the DC component of FIG. 24B, the required number of bits is larger, so requantization is performed in step 211. The requantization coefficient $F(B_{cr}, B'_{cr})$ is "5".

Further, in step 212, bit strings of fixed lengths arranged in the order of the quantized error data $\Delta$Yuv, $\Delta$Cbuv, and $\Delta$Cruv are produced. The fixed length is "12" in the DC component and "11" in the AC component. Note that in place of the array in step 212, a cyclic array as shown in FIG. 15 is also possible. By this, it is possible to reduce the entropy. In step 213, the parameter u is incremented by "1". When the parameter u is less than 7, the routine returns from step 214 to step 203 and steps 203 on are executed.

In step 203, processing the same as above is executed. In the quantization tables shown in FIGS. 24A and 24B, when for example the parameter u is "4" and the parameter v is "0" the quantization coefficient $Q(Y)_{40}=24$ and $Q(Cb)_{40}=Q(Cr)_{40}=99$. In FIG. 28, the required numbers of bits is $B_y=5$, $B_{cb}=B_{cr}=7$. Further, in step 204, the sum $B_{all}$ of the required number of bits $B_y$, $B_{cb}$, and $B_{cr}$ is calculated. The sum $B_{all}$ of the required numbers of bits is "19".

Step 205 determines whether the sum $B_{all}$ is larger than the sum $S_{all}$ of the set number of bits. Since the sum $S_{all}$ of the set numbers of bits is "11" in the case of the AC components, when the parameters u and v are "4" and "0" respectively, the sum $B_{all}$ of the required numbers of bits is larger than the sum $S_{all}$ of the set numbers of bits and steps 206-end are executed.

Step 206 determines whether the required number of bits $B_y$ of the quantized error data $\Delta$Yuv is larger than the set number of bits $S_y$. When the parameters u and v are "4" and "0" in FIGS. 24A and 24B, the required number of bits $B_y=5$ and the set number of bits $S_y=5$. The required number of bits is therefore equal to the set number of bits. In this case, requantization does not have to be performed, so steps 208-end on are executed. In step 208 through 211, like with the DC component, requantization of the quantized error data $\Delta$Cbuv and $\Delta$Cruv is performed and the numbers of bits of the quantized error data $\Delta$Cbuv and $\Delta$Cruv change from 7 bits to 3 bits.

After the bit strings are produced in step 212, when step 214 determines that parameter u is larger than "7", parameter v is incremented by "1" in step 215. Step 216 determines whether parameter v is larger than "7". If parameter v is not larger than "7", the routine returns to step 202, where the above processing is performed.

When step 216 determines that parameter v is larger than "7", the processing routine is ended.

As described above, in the fourth embodiment, when the sum $B_{all}$ of the number of bits required for storing the quantized error data $\Delta$Yuv, $\Delta$Cbuv, and $\Delta$Cruv is not more than "11" in the case of the AC components and not more than "12" in the case of the DC component, the quantized error data is not requantized. Further, when requantizing the quantized error data, use is made of the requantization coefficients $F(B_y, B'_y)$ $F(B_{cb}, B'_{cb})$, and $F(B_{cr}, B'_{cr})$ having values corresponding to these quantization coefficients at the component positions of the quantization tables. Accordingly, effective bit distribution of the quantized error data is possible and unnecessary requantization of quantized error data more than required is avoided. That is, according to this embodiments the efficiency of utilization of the fourth component of the JPEG format is further improved from the first to third components.

According to the fourth embodiments the bit distribution of the quantized error data is easily determined based on just the values of the quantization coefficients and requantization coefficients (FIG. 27) in the quantization tables (FIGS. 24A and 24B) and there is no need for complicated calculation equations.

Figure 29:
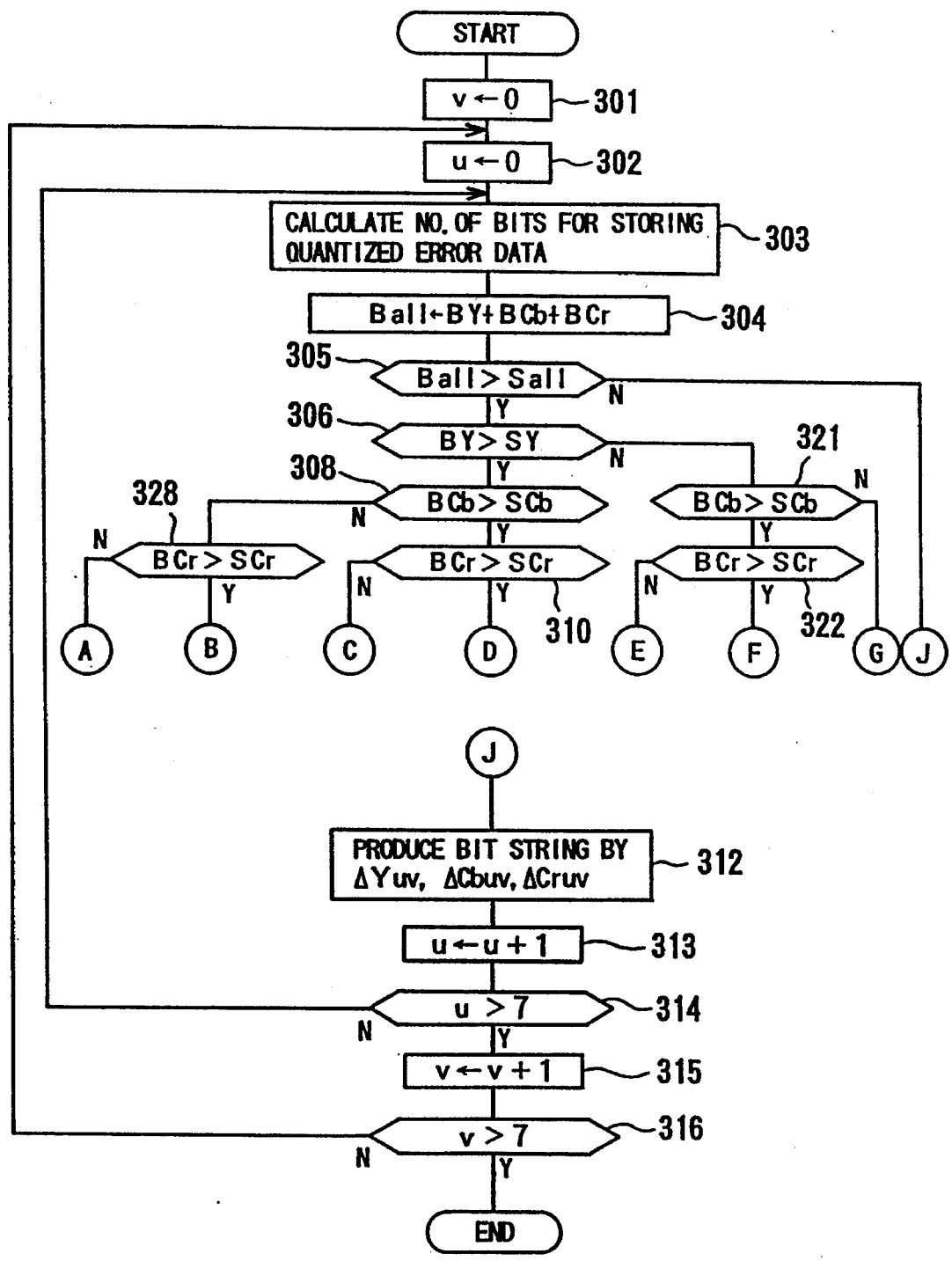
FIG. 29 is a flow chart of a processing routine for producing quantized error data in a fifth embodiment.
Figure 30:
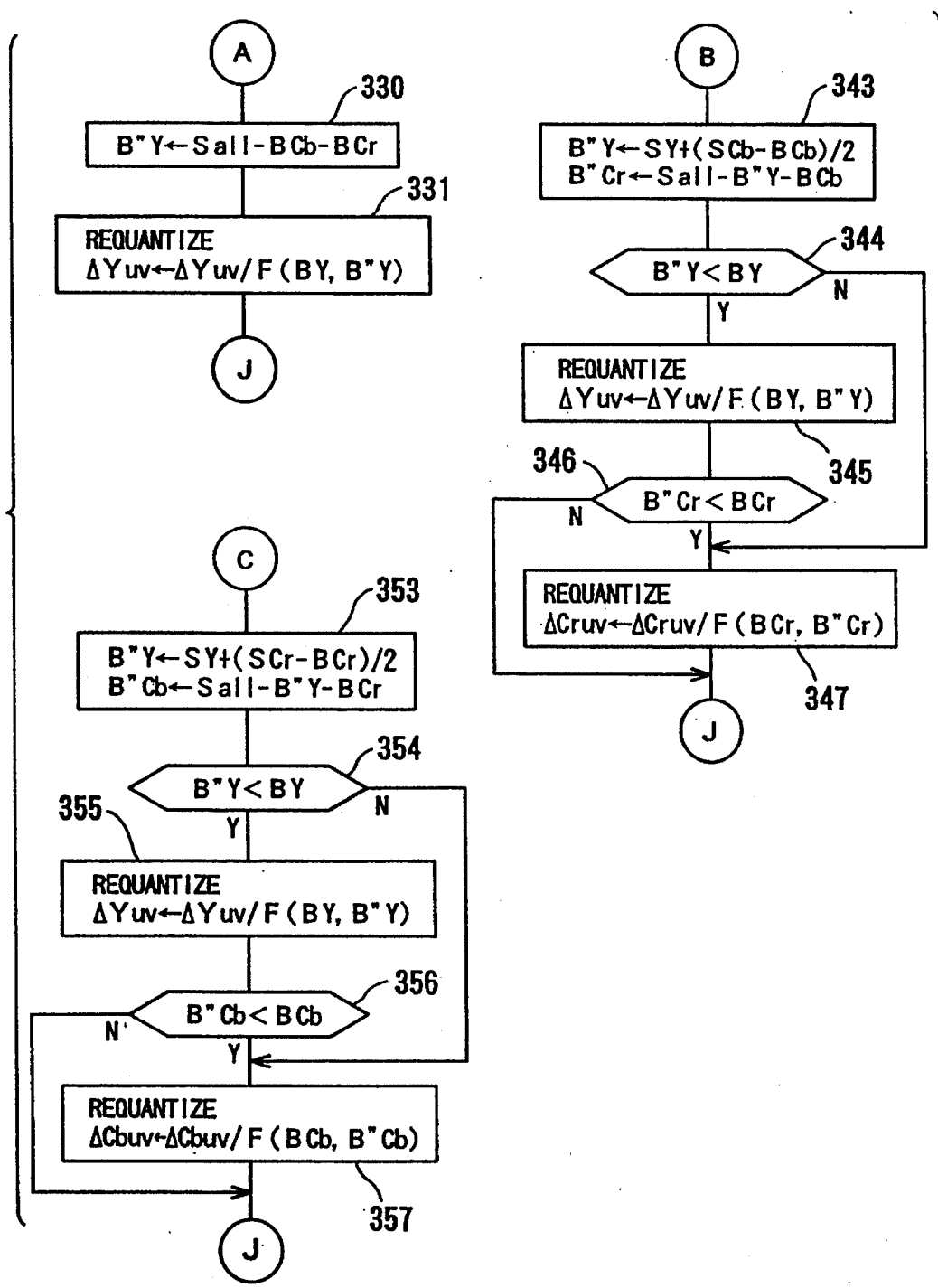
FIG. 30 is a flow chart of steps of part of the processing routine shown in FIG. 29.
Figure 31:
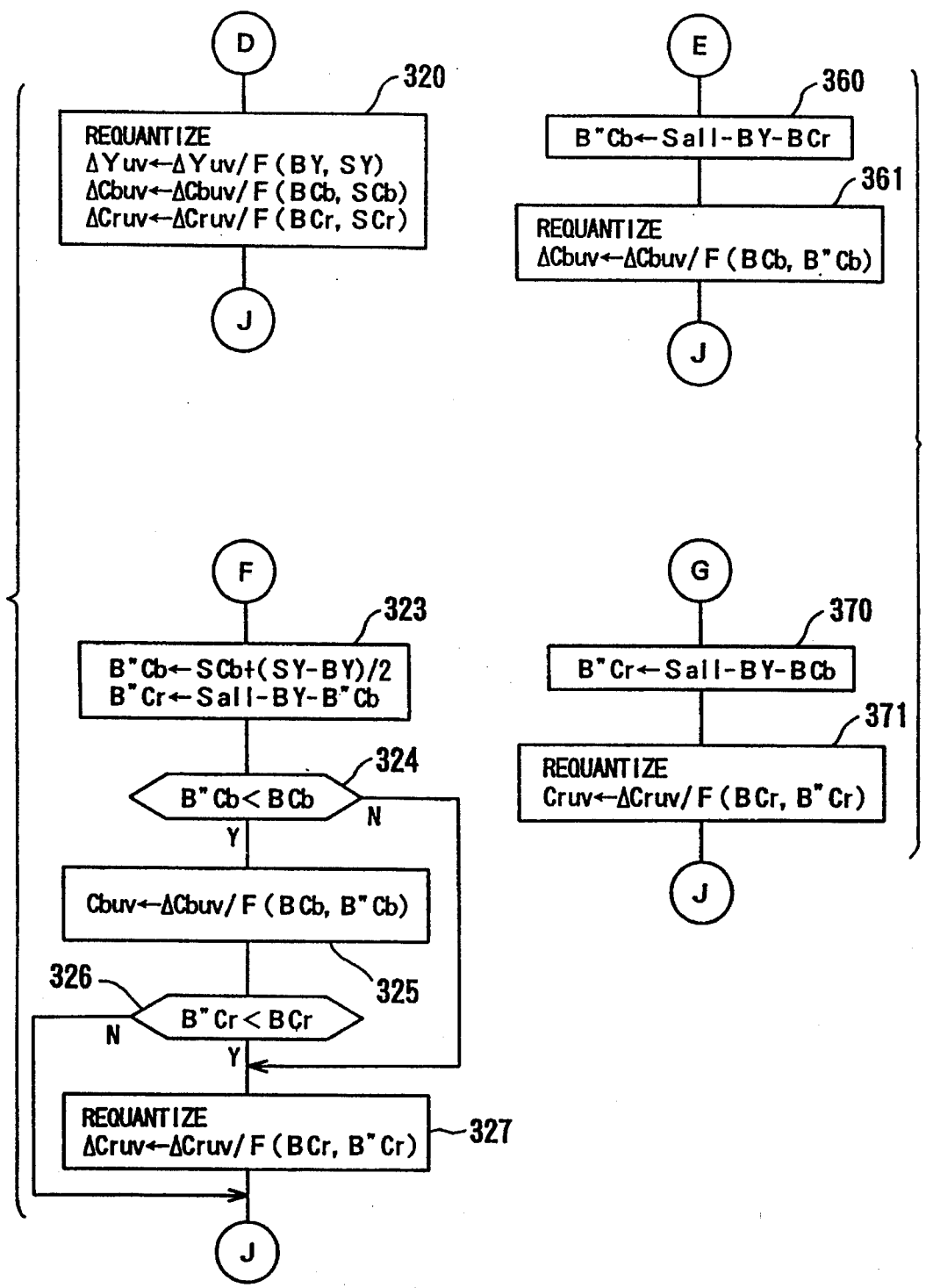
FIG. 31 is a flow chart of steps of part of the processing routine shown in FIG. 29.

FIGS. 29 through 31 show a flow chart of a processing routine for producing quantized error data in a fifth embodiment.

The contents of steps 301 to 304 are the same as those of steps 201 to 204 shown in FIG. 25. Similar to the fourth embodiment, for the bit distribution of the quantized error data of the DC component, the set number of bits $S_y$ of the quantized error data $\Delta$Yuv is determined as "6" and the set number of bits $S_{cb}$ and $S_{cr}$ of the quantized error data $\Delta$Cbuv and $\Delta$Cruv are determined as "3". For the AC component, the set number of bits $S_y$ of the quantized error data $\Delta$Yuv is determined as "5" and the set numbers of bits $S_{cb}$ and $S_{cr}$ of the quantized error data $\Delta$Cbuv and $\Delta$Cruv are determined as "3" respectively.

Step 305 determines whether the sum $B_{all}$ of the required number of bits is large than the sum $S_{all}$ of the set number of bits. When the sum $B_{all}$ of the required number of bits is less than the sum $S_{all}$ of the set number of bits, steps 312-end are executed without requantization of the quantized error data. The contents of steps 312 to 316 are the same as those of steps 212 to 216 shown in FIG. 26.

When the sum $B_{all}$ of the required number of bits is larger than the sum $S_{all}$ of the set number of bits, and the individual required number of bits $B_y$, $B_{cb}$, and $B_{cr}$ are larger than the set number of bits $S_y$, $S_{cb}$, and $S_{cr}$, steps 305, 306, 308, 310, and 320 are executed in that order. That is, all quantized error data $\Delta$Yuv, $\Delta$Cbuv, and $\Delta$Cruv is requantized, then, step 312 arranges the quantized error data $\Delta$Yuv, $\Delta$Cbuv, and $\Delta$Cruv in order and produces bit strings of fixed lengths.

The operation explained up to here is the same in the end as that of the fourth embodiment.

In the case of the DC component of the quantization tables shown in FIGS. 24A and 24B, as described above, the required number of bits become $B_y=4$ and $B_{cb}=B_{cr}=5$, respectively (see FIG. 28). In step 304, the sum $B_{all}$ of the required numbers of bits $B_y$, $B_{cb}$, and $B_{cr}$ is calculated and "14" is obtained. In step 305, it is determined that the sum $B_{all}$ of the required number of bits is larger than the sum $S_{all}$ of the set number of bits, so step 306 is executed. In step 306, it is determined whether the required number of bits $B_y$ is larger than the set number of bits $S_y$. In the case of the DC component of FIG. 24A, the required number of $B_y$ "4" is smaller than the set number of bits $S_y$ "6". In other words, since the number of bits required for storing the quantized error data ΔYuv is smaller than even the set number of bits, the bits for storing the quantized error data ΔYuv may be used for storing the other quantized error data ΔCuv and ΔCruv.

The routing next proceeds to step 321, to determine whether the required number of bits $B_{cb}$ is larger than the set number of bits $S_{cb}$. In the case of the DC component of FIG. 24B, since the required number of bits $B_{cb}=B_{cr}=5$ and the set numbers of bits $S_{cb}=S_{cr}=3$, steps 321, 322, and 323 are executed in order. In step 323, the bits for storing the quantized error data ΔCbuv and ΔCruv are increased, In step 323, the maximum number of bits $B''_{cb}$ and $B''_{cr}$ are increased in accordance with equations (18) and (19).

$$B''_{cb}=S_{cb}+(S_y-B_y)/2 \quad (18)$$

$$B''_{cr}=S_{all}-B_y-B''_{cb} \quad (19)$$

In the case of the DC component of FIGS. 24A and 24B, the maximum number of bits $B''_{cb}=B''_{cr}=4$ (see FIG. 28)

When the maximum number of bits $B''_{cb}$ increased n step 323 is more than the required number of bits $B_{cb}$, that is, when the number of bits $B_{cb}$ for storing the quantized error data ΔCbuv is not as large as the increased number of bits $B''_{cb}$, the routine proceeds from step 324 to step 327. That is, requantization is performed for the quantized error data ΔCruv, but requantization is not performed for the quantized error data ΔCbuv. However, when the maximum number of bits $B''_{cb}$ is smaller than the required number of bits $B_{cb}$, the routine proceeds from step 324 to step 325, where requantization is performed for the quantized error data ΔCbuv. In step 326, it is determined whether the maximum number of bits $B''_{cr}$ is smaller than the required number of bits $B_{cr}$. When the maximum number of bits $B''_{cr}$ is smaller than the required number of bits $B_{cr}$, requantization is performed on the quantized error data ΔCruv, at step 327. When the maximum number of bits $B''_{cr}$ is more than the required number of bits $B_{cr}$, it is not necessary to perform a requantization on the quantized error data ΔCruv, so step 327 is skipped.

Then, steps 312-end are executed. When bit strings have been produced for the quantized error data of all component positions, the routine is completed.

In the quantization tables shown in FIGS. 24A and 24B, when for example the parameter u is "4" and the parameter v is "0", as described above, the required number of bits become respectively $B_y=5$ and $B_{cb}=B_{cr}=7$ (see FIG. 28). That is, the sum $B_{all}$ "19" of the required number of bits $B_y$, $B_{cb}$, and $B_{cr}$ is larger than the sum $S_{all}$ "11" of the set number of bits, the required number of bits $B_y$ becomes equal to the set number of bits $S_y$ "5", and the required numbers of bits $B_{cb}$ and $B_{cr}$ become larger than the set numbers of bits $S_{cb}$ and $S_{cr}$ "3". Accordingly, steps 305, 306, 321, and 322 are executed in that order, then steps 323 to 327 are executed. Note that in step 323, the maximum number of bits $B''_{cb}=B''_{cr}=3$ (see FIG. 28). In this case, unlike the case of the DC component, the maximum number of bits $B''_{cb}=B''_{cr}$ becomes the same value as the set number of bits.

As shown in FIG. 28, when the quantization coefficient Q(Y)uv=7 and Q(Cb)uv=Q(Cr)uv=65, the required number of bits are $B_y=3$ and $B_{cb}=B_{cr}=7$. The total number $B_{all}$ is larger than the sum $S_{all}$ "11" of the set number of bits. The required number of bits $B_y$ is smaller than the set number of bits $S_y$ "5", and the required number of bits $B_{cb}$ and $B_{cr}$ "7" is larger than the set number of bits $S_{cb}$ and $S_{cr}$ "3" Accordingly, steps 305, 306, 321, and 322 are executed in order, then steps 323 to 327 are executed. Note that in step 323, the maximum number of bits $B''_{cb}=B''_{cr}=4$ (see FIG. 28). In this case, like with the case of the DC component, the maximum number of bits $B''_{cb}=B''_{cr}$ increase over the set number of bits as well.

As shown in FIG. 28, when the quantization coefficient Q(Y)uv=129, Q(Cb)uv=Q(Cr)uv=3, the required number of bits are $B_y=8$ and $B_{cb}=B_{cr}=2$. The total number $B_{all}$ is larger than the sum $S_{all}$ "11" of the set numbers of bits. The required number of bits $B_y$ "8" is larger than the set number of bits $S_y$ "5", and the required number of bits $B_{cb}$ and $B_{cr}$ "2" is smaller than the set numbers of bits $S_{cb}$ and $S_{cr}$ "3". Accordingly, to increase the bits to store the quantized error data ΔYuv, after steps 305, 306, 308, and 328 are executed, the maximum number of bits $B''_y$ is found in accordance with equation (20) in step 330.

$$B''_y=S_{all}-B_{cb}-B_{cr} \quad (20)$$

In this examples the maximum number of bits $B''_y=7$ (see FIG. 28).

In step 331, requantization is performed on the quantized error data ΔYuv and then steps 312-end are executed.

The processing in steps 343 to 347 and steps 353 to 357 is similar to that of steps 323 to 327. Further, the processing in steps 360 and 361 and in steps 370 and 371 are similar to those in steps 330 and 331, respectively.

As described above, according to the fifth embodiment, when one or two of the required number of bits in the quantized error data is smaller than the set numbers of bits, the bits used for storing those quantized error data are used for storing the other quantized error data. Accordingly, the efficiency of utilization of the fourth component of the JPEG format is improved.

Note that in the above embodiments, the set number of bits $S_y$, $S_{cb}$, $S_{cr}$ are recorded to an IC memory card M.

Furthers in the above embodiments, use was made of a DCT transformation as the orthogonal transformation of the original image data, but the present invention is not limited to this. Furthers the recording medium of the image data 80 is not limited to an IC memory card Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 5-197994 (filed on Jul. 15, 1993) and Japanese Patent Application No. 6-123093 (filed on May 12, 1994) which are expressly incorporated herein, by reference, in their entirety.

I claim:

1. An image signal processing device, comprising:

orthogonal transformation means for applying an orthogonal transformation to original image data comprising at least one image component to obtain orthogonal transformation coefficients corresponding to predetermined spatial frequencies for each image component, said original image data comprising a first, a second, and a third image component;

quantization means for quantizing said orthogonal transformation coefficients, comprising quantization tables including quantization coefficients to obtain quantized orthogonal transformation coefficients;

first inverse quantization means for inversely quantizing said quantized orthogonal transformation coefficients to obtain restored orthogonal transformation coefficients;

error data producing means for obtaining quantized error data of a difference between said restored orthogonal transformation coefficients and said orthogonal transformation coefficients for each image component;

encoding means for encoding said quantized error component and said quantized orthogonal transformation coefficients to form a compressed image data;

error data synthesizing means for arranging said quantized error data into unit data of a fixed length for each same spatial frequency of components so as to synthesize a fourth component, said encoding means encodes said fourth component and said quantized orthogonal transformation coefficients to form compressed image data; and recording means for recording said compressed image data to a recording medium.

2. An image signal processing device according to claim 1, wherein said error data synthesizing means comprises bit number allocating means for allocating a number of bits comprising said quantized error data stored in said fourth component so that the component among said first, second, and third components which has the greatest effect on the visual characteristics of the reproduced image is lengthened.

3. An image signal processing device according to claim 2, wherein said error data synthesizing means comprises error data quantization means for requantizing said quantized error data when the number of bits allocated by said bit allocating means is less than said quantized error data.

4. An image signal processing device according to claim 3, wherein said error data quantization means uses a maximum value of said quantization coefficients of said quantization tables so as to requantize all components of the quantized error data.

5. An image signal processing device as set forth in claim 3, wherein said error data quantization means uses the requantization coefficients corresponding to said quantization coefficients of the quantization tables to requantize predetermined constituent elements of the quantized error data.

6. An image signal processing device according to claim 5, wherein when the number of bits of any of said quantized error data of a requantized first, second, and third component is smaller than said allocated number of bits, said error data quantization means lengthens the number of bits of the quantized error data of the other components by the amount corresponding to said fixed length.

7. An image signal processing device according to claim 2, further comprising sign adjusting means for multiplying by "−1" said quantized error data corresponding to an orthogonal transformation coefficient outputted from the orthogonal transformation means when the orthogonal transformation coefficient is negative.

8. An image signal processing device according to claim 7, further comprising scaling means for obtaining encoded error data by allocating code words to quantized error data, adjusted in sign by said sign adjusting means, which are shorter in length, the higher the frequency of occurrence.

9. An image signal processing device according to claim 7, wherein when the numbers of bits of the encoded error data are k, m, and n ($k \geq m \geq n$) in said error data synthesizing means producing the fourth component from said encoded error data;

wherein a topmost bit to an (m+1) bit of said quantized error data to which k number of bits has been allocated are stored in a first area of said fourth component from said topmost bit to a (2m+n+1) bit of said fourth component;

an m-th bit to an (n+1) bit of said quantized error data to which k number of bits has been allocated and a topmost bit to an (n+1) bit of the quantized error data to which m number of bits has been allocated are alternately stored in a second area from a (2m+n) bit to a (3n+1) bit of said fourth component; and an n-th bit to a bottommost bit of said quantized error data to which k number of bits has been allocated, said n-th bit to said bottommost bit of the quantized error data to which m number of bits has been allocated, and all of the bits of the quantized error data to which n number of bits has been allocated are stored cyclically in a third area from a 3n-th bit to a bottommost bit of said fourth component.

10. An image signal processing device according to claim 1, further comprising:

decoding means for reading out said compressed image data from said recording medium and decoding from said compressed image data said quantized orthogonal transformation coefficients and said fourth component;

second inverse quantization means for inversely quantizing said quantized orthogonal transformation coefficients to reproduce said orthogonal transformation coefficients;

error data separating means for separating error data of the components comprising said compressed image data from said fourth component;

adding means for adding said error data to said orthogonal transformation coefficients; and inverse orthogonal transformation means for performing an inverse orthogonal transform on said orthogonal transformation coefficients outputted from said adding means so as to reproduce image data.

11. An image signal processing device according to claim 1, further comprising:

decoding means for reading out the compressed image data from the recording medium and decoding quantized orthogonal transformation coefficients and an error component from the compressed image data;

second inverse quantization means for inversely quantizing said quantized orthogonal transformation coefficients to reproduce said orthogonal transformation coefficients;

error data separating means for separating error data of components comprising the compressed image data from said error component;

adding means for adding said error data to said orthogonal transformation coefficients; and inverse orthogonal transformation means for performing an inverse orthogonal transform on the orthogonal transformation coefficients outputted from said adding means so as to reproduce image data.

12. An image signal processing device comprising:

orthogonal transformation means for applying orthogonal transformation to original image data comprising at least one image component to obtain orthogonal transformation coefficients for each image component, said original image data comprising a first, a second and a third component;

quantization means for quantizing said orthogonal transformation coefficients, comprising quantization tables including quantization coefficients to obtain the quantized orthogonal transformation coefficients;

first inverse quantizing and inverse orthogonal transformation means for inverse quantization and inverse orthogonal transformation of said quantized orthogonal transformation coefficients to obtain restored inverse orthogonal transformation coefficients;

error data producing means for obtaining error data of a difference between said restored inverse orthogonal transformation coefficients and said original image data for each component;

encoding means for encoding said error data and said quantized orthogonal transformation coefficients to form compressed image data;

error data synthesizing means for arranging said error data into unit data of a fixed length for each same spatial frequency of components to synthesize a fourth component, and said encoding means encodes said fourth component and said quantized orthogonal transformation coefficients to form compressed image data; and recording means for recording said compressed image data in a recording medium.

13. An image signal processing device according to claim 12, further comprising:

decoding means for reading out said compressed image data from said recording medium and decoding from said compressed image data said quantized orthogonal transformation coefficients and fourth component;

second inverse quantization means for inversely quantizing said quantized orthogonal transformation coefficients and reproducing said orthogonal transformation coefficients;

error data separating means for separating said error data of the components comprising said compressed image data from said fourth component;

inverse orthogonal transformation means for performing an inverse orthogonal transform on said orthogonal transformation coefficients to reproduce image data; and adding means for adding said error data to said reproduced image data.

14. An image signal processing device according to claim 12, further comprising:

decoding means for reading out the compressed image data from the recording medium and decoding quantized orthogonal transformation coefficients and an error component from the compressed image data;

second inverse quantization means for inversely quantizing said quantized orthogonal transformation coefficients to reproduce orthogonal transformation coefficients;

error data separating means for separating error data of components comprising the compressed image data from said error component;

adding means for adding said error data to said orthogonal transformation coefficients; and inverse orthogonal transformation means for performing an inverse orthogonal transform on said orthogonal transformation coefficients outputted from said adding means to reproduce image data.

* * * * *

UNITED STATES PATENT AND TRADEMARK OFFICE
CERTIFICATE OF CORRECTION

PATENT NO. : 5,497,246
DATED : March 5, 1996
INVENTOR(S) : N. ABE

It is certified that error appears in the above-indentified patent and that said Letters Patent is hereby corrected as shown below:

At column 22, line 4, (claim 9, line 2), change "7," to ---5,---.

Signed and Sealed this

Twenty-eighth Day of January, 1997

Attest:

BRUCE LEHMAN

Attesting Officer     Commissioner of Patents and Trademarks